US006299238B1

(12) United States Patent
Takagi et al.

(10) Patent No.: US 6,299,238 B1
(45) Date of Patent: Oct. 9, 2001

(54) SIDE STRUCTURE FOR VEHICLE BODY

(75) Inventors: Hideo Takagi, Yokohama; Kouichi Sagawa, Ebina, both of (JP)

(73) Assignee: Nissan Motor Co., LTD, Yokohama (JP)

(*) Notice: Subject to any disclaimer, the term of this patent is extended or adjusted under 35 U.S.C. 154(b) by 0 days.

(21) Appl. No.: 09/689,739

(22) Filed: Oct. 13, 2000

(30) Foreign Application Priority Data

Nov. 9, 1999 (JP) .................................................. 11-318597

(51) Int. Cl.[7] .............................. B62D 27/02; B60N 2/427
(52) U.S. Cl. ..................... 296/188; 296/68.1; 297/216.13
(58) Field of Search .................................. 296/188, 68.1; 297/216.1, 216.13, 216.18

(56) References Cited

U.S. PATENT DOCUMENTS 5,246,264 * 9/1993 Yoshii ........................... 296/203.03
5,407,244 * 4/1995 Nakano et al. ..................... 296/68.1
5,584,525 * 12/1996 Nakano et al. ..................... 296/68.1

FOREIGN PATENT DOCUMENTS 8-26144   1/1996  (JP) .
9-169232  6/1997  (JP) .

* cited by examiner

Primary Examiner—Dennis H. Pedder
(74) Attorney, Agent, or Firm—Foley & Lardner

(57) ABSTRACT

A side structure is provided to restrict the rotation of a seat when a side impact is exerted on a vehicle body. In order to reinforce the passenger's seat 7 in a vehicle's width direction, the side structure includes a load-direction converting member 24 arranged in the passenger's seat 7 to extend in the vehicle's width direction. A center pillar 1 has an engagement member 25 attached to an inner pillar member 12. When a side impact is applied on the vehicle body, the engagement member 25 engages with an outermost end 24a of the member 24 to prevent the passenger's seat from rotating.

24 Claims, 28 Drawing Sheets

44

SIDE STRUCTURE FOR VEHICLE BODY

BACKGROUND OF THE INVENTION

1. Field of the Invention

The present invention relates to a side structure for a vehicle body, which is capable of absorbing a collision energy exerted on the lateral side of the vehicle body, effectively.

2. Description of the Related Art

As the conventional side structure of this kind, Japanese Patent Publication (kokai) No. 9-169232 discloses one side structure where a reinforcement pipe is inserted into a lower frame element constituting a seat back frame for a passenger's seat.

However, the above side structure has been provided on the assumption of the vehicle's side collision with a general car having a relatively-low height, such as sedan. Therefore, if the vehicle has a side collision with another vehicle having a bumper arranged at a relatively-high position, for example, recent RV (recreational vehicle), truck, etc., there may be generated a moment which rotates the passenger's seat itself about one seat bearing point as a center since there is a great distance along a vehicle's height-direction between a load input point on the passenger's seat and the seat bearing point. Consequently, due to the rotation of the passenger's seat, a problem arises in that the impact load is not transmitted from the passenger's seat to a body framework, such as a floor panel, sufficiently. Under the situation, the seat back frame is required to have its axial strength necessary for the transmission of a load from the lateral side of the vehicle body and also an attachment strength resistant to the moment due to the load, causing the weight of the seat back frame to be increased disadvantageously.

Meanwhile, Japanese Patent Publication (kokai) No. 8-26144 discloses a structure which is directed to the countermeasure of the vehicle side collision beside a rear floor section of the vehicle body in order to improve the transmission of load on the vehicle framework. In this structure, a reinforcement member having a depression is secured to an automotive rear door. While, a cross member is mounted on an automotive rear floor. The cross member is provided, on a lateral side thereof, with a projecting stopper member for engagement with the reinforcement member. At the vehicle collision, the stopper member is fitted into the depression of the reinforcement member, so that the collision load is transmitted from the reinforcement member to the "closed-sectional" cross member while restricting an upward displacement of the rear door.

If the above-mentioned structure is applied to prevent the passenger's seat from rotating, then a problem arises in that the position of the passenger's seat cannot be adjusted freely. Nevertheless, if it is desired to maintain the degree of freedom in positioning the passenger's seat, then the cross member has to possess a number of stopper members corresponding to a number of seat positions, causing a problem of increasing the number of assembling steps remarkably.

SUMMARY OF THE INVENTION

Under the above circumstance, it is an object of the present invention to provide a side structure for a vehicle body, which is capable of restricting the rotation of the passenger's seat when a load is exerted on the lateral side of the vehicle body and which can transmit the load to the vehicle framework through the intermediary of the passenger's seat.

According to the invention, the above-mentioned object is accomplished by a side structure for a vehicle body, comprising:
   a center pillar arranged on a lateral side of a passenger's room to extend up and down, the passenger's room being defined by the vehicle body;
   a side panel positioned in front and behind the center pillar, respectively;
   a floor panel arranged at the bottom of the passenger's room;
   a passenger's seat arranged on the floor panel, the passenger's seat having a seat back and a seat cushion;
   a seat back frame disposed inside the seat back;
   a reinforcement member disposed inside the seat back so as to extend in a vehicle's width direction; and
   a rising-preventive mechanism arranged inside the center pillar or the side panel to prevent an outermost end of the reinforcement member in the vehicle's width direction from rising when a side impact is applied on the vehicle body.

According to the present invention, the above object is also accomplished by a side structure for a vehicle body, comprising:
   a center pillar arranged on a lateral side of a passenger's room to extend up and down, the passenger's room being defined by the vehicle body;
   a side panel positioned in front and behind the center pillar;
   a floor panel arranged at the bottom of the passenger's room;
   a passenger's seat arranged on the floor panel, the passenger's seat having a seat back and a seat cushion;
   a seat back frame disposed inside the seat back;
   a reinforcement member disposed inside the seat back so as to extend in a vehicle's width direction; and
   a rising-preventive mechanism arranged inside the center pillar or the side panel to prevent an outermost end of the reinforcement member in the vehicle's width direction from rising when a side impact is applied on the vehicle body, the rising-preventive mechanism having an engagement member which engages with the outermost end of the reinforcement member when the side impact is applied on the vehicle body.

Further, there is also provided a side structure for a vehicle body, comprising:
   a center pillar arranged on a lateral side of a passenger's room to extend up and down, the passenger's room being defined by the vehicle body;
   a side panel positioned in front and behind the center pillar, respectively;
   a floor panel arranged at the bottom of the passenger's room;
   a passenger's seat arranged on the floor panel, the passenger's seat having a seat back and a seat cushion;
   a seat back frame disposed inside the seat back;
   a reinforcement member disposed inside the seat back so as to extend in a vehicle's width direction; and
   rising-preventive means for preventing an outermost end of the reinforcement member in the vehicle's width direction from rising due to a side impact applied on the vehicle body, the rising-preventive means being arranged beside the passenger's seat.

DESCRIPTION OF THE PREFERRED EMBODIMENT

Figure 1:
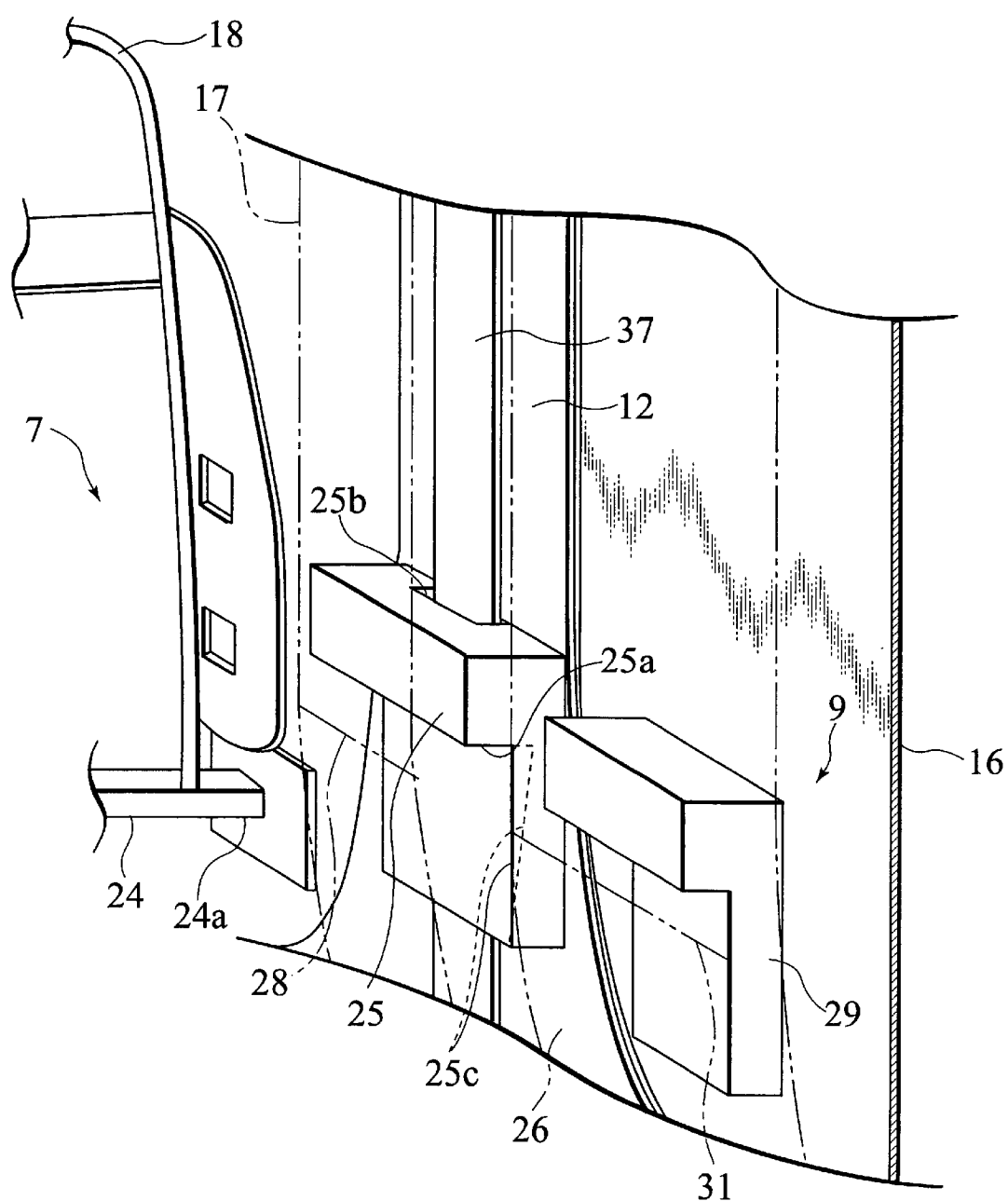
FIG. 1 is a perspective view of an essential part of the side structure of the vehicle body, in accordance with the first embodiment of the present invention.
Figure 2:
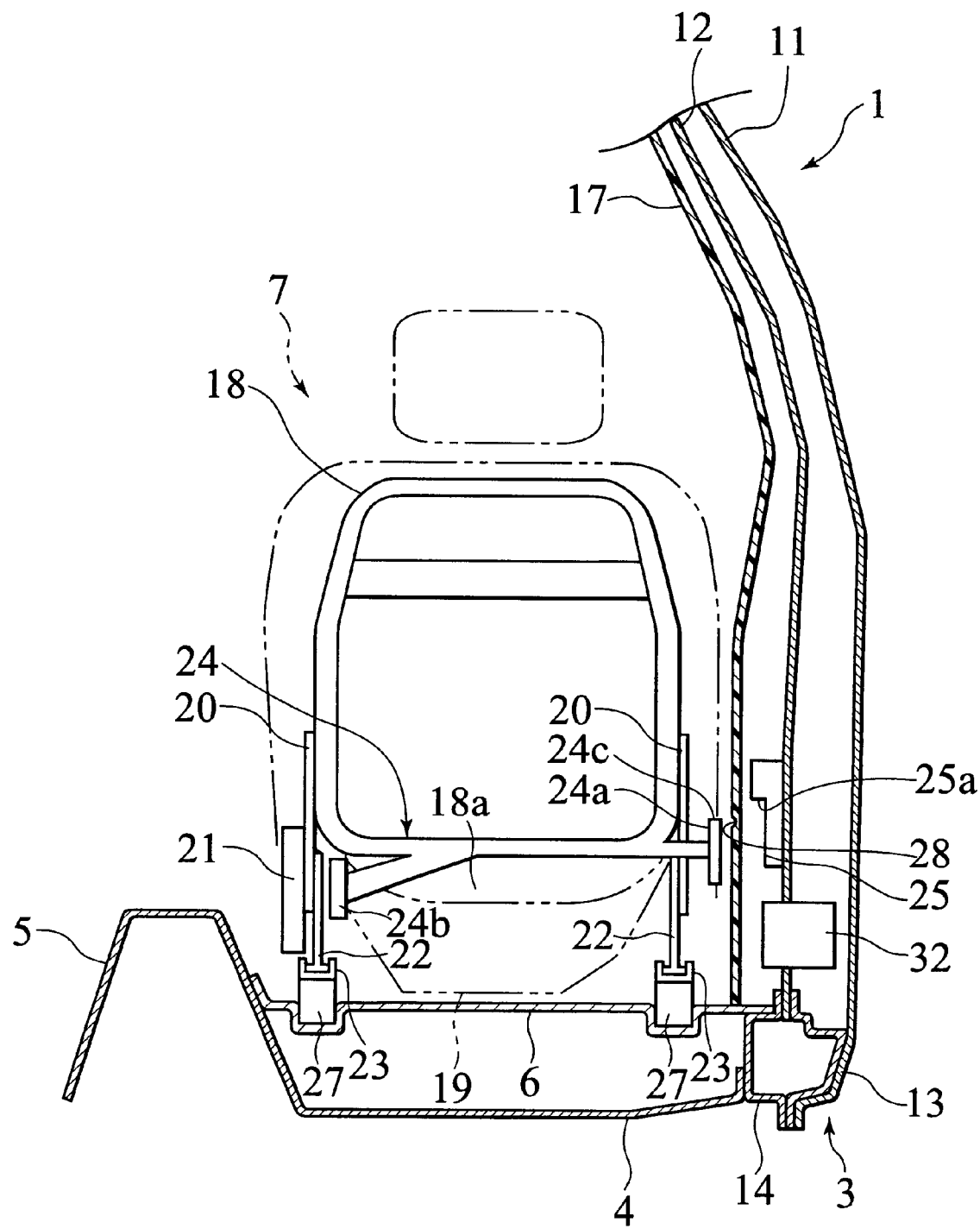
FIG. 2 is a sectional view of the side structure of the first embodiment, viewed from the front side of the vehicle body.

Referring to accompanying drawings, various embodiments of the present invention will be described below.

[1st. Embodiment]

FIGS. 1 to 8 illustrate the first embodiment of the present invention.

In these figures, reference numeral 1 designates a center pillar as one framework member, which is arranged on one lateral side of a passenger's room to extend up and down. The center pillar 1 has an outer pillar member 11 and an inner pillar member 12. Beneath the center pillar 1, a side sill 3 is formed to extend in a fore-and-aft direction of the vehicle. The side sill 3 has an outer sill member 13 and an inner sill member 14. The side sill 3 is joined to a lateral end of a floor panel 4 disposed at the bottom of the passenger's room. The floor panel 4 is provided, at its center in the vehicle's width direction, with a floor tunnel 5 which projects upward and also extends in the fore-and-aft direction of the vehicle. Welded to the so-formed floor panel 4 is a floor cross member 6 which extends between the side sill 3 and the floor tunnel 5 in the vehicle's width direction. Of course, the floor panel 4 has another floor cross member (not shown) welded thereto on the opposite side of the member 6 over floor tunnel 5. A front door 9 is arranged in front of the center pillar 1. A rear door 10 is also arranged behind the center pillar 1. Both of the front door 9 and the rear door 10 form a side panel of the invention, which is arranged on one lateral side of the passenger's room. In this way, the above-mentioned elements form a vehicle body as the basic structure. A resinous pillar garnish 17 is attached to the inner pillar member 12 of the center pillar 1. Additionally, seat rails 23 in pairs are respectively fixed on seat legs 27 so as to extend in the fore-and-aft direction of the vehicle. The seat legs 27 are fixed on the floor cross member 6 on the floor panel 4. A passenger's seat 7 is slidably mounted on the seat rails 23. The seat 7 has a seat back frame 18, a seat pan 19, a pair of reclining plates 20, a reclining device 21 and a pair of seat base plates 22.

In the passenger's seat 7, the seat back frame 18 has a lower frame (part) 18a. According to the embodiment, the lower frame part 18a of the seat back frame 18 is provided, in one body, with a load-direction converting member 24 which has a reinforcement function in the vehicle's width direction and also transmits a side load (impact), which has been inputted to a vehicle body's part higher than the floor tunnel 5, toward the floor tunnel 5. The load-direction converting member (i.e a reinforcement member) 24 has its outside part in the vehicle's width direction, formed to project from the seat back frame 18. The outer end of the load-direction converting member 24 is welded to a flat plate 24a. In the vehicle's width direction, the inside part of the load-direction converting member 24 is formed so as to extend from the general center of the lower frame 18a obliquely downward. Thus, the inner end of the load-direction converting member 24 is welded to a flat plate 24b. The flat plate 24b is positioned so as to leave a clearance against the seat base plate 22 in the vehicle's width direction. The center of the flat plate 24b is in alignment with a seat reclining center.

Figure 3:
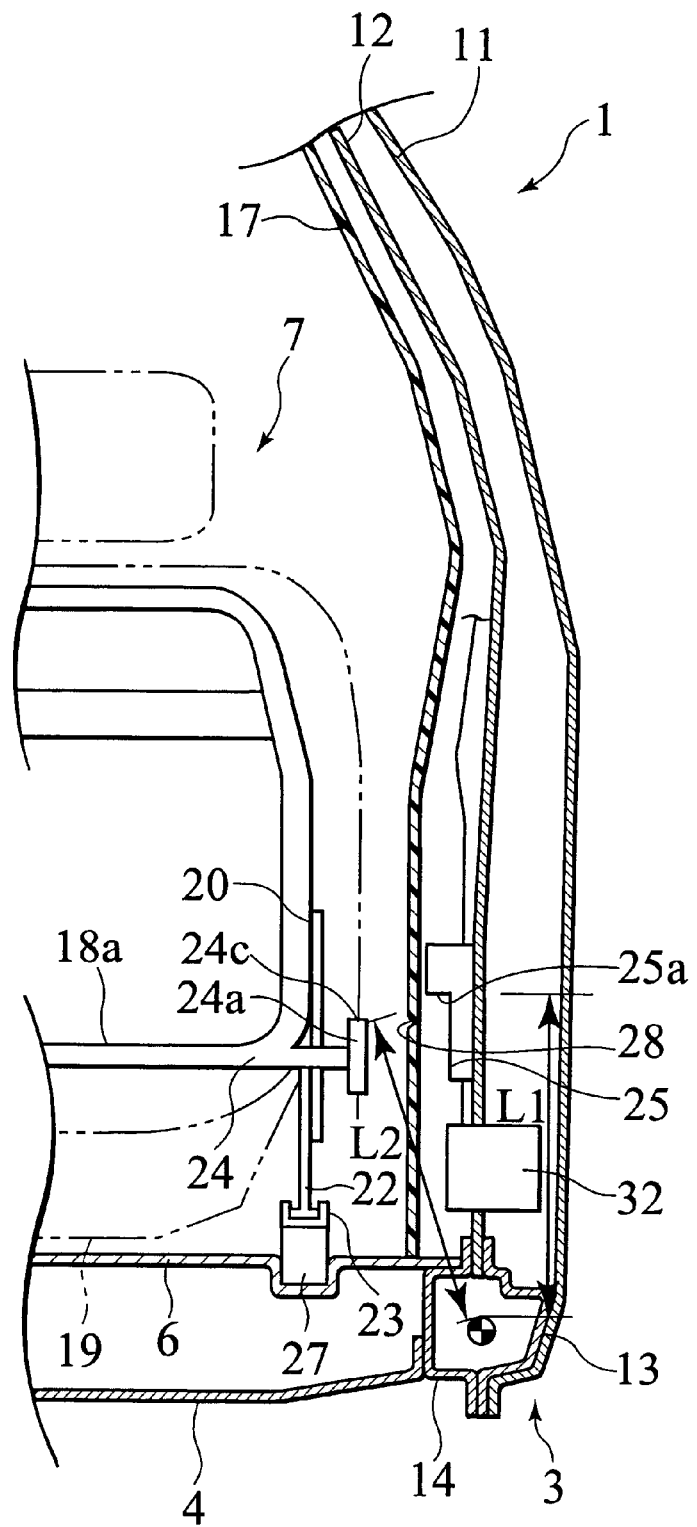
FIG. 3 is an enlarged sectional view of the side structure of the first embodiment.
Figure 4:
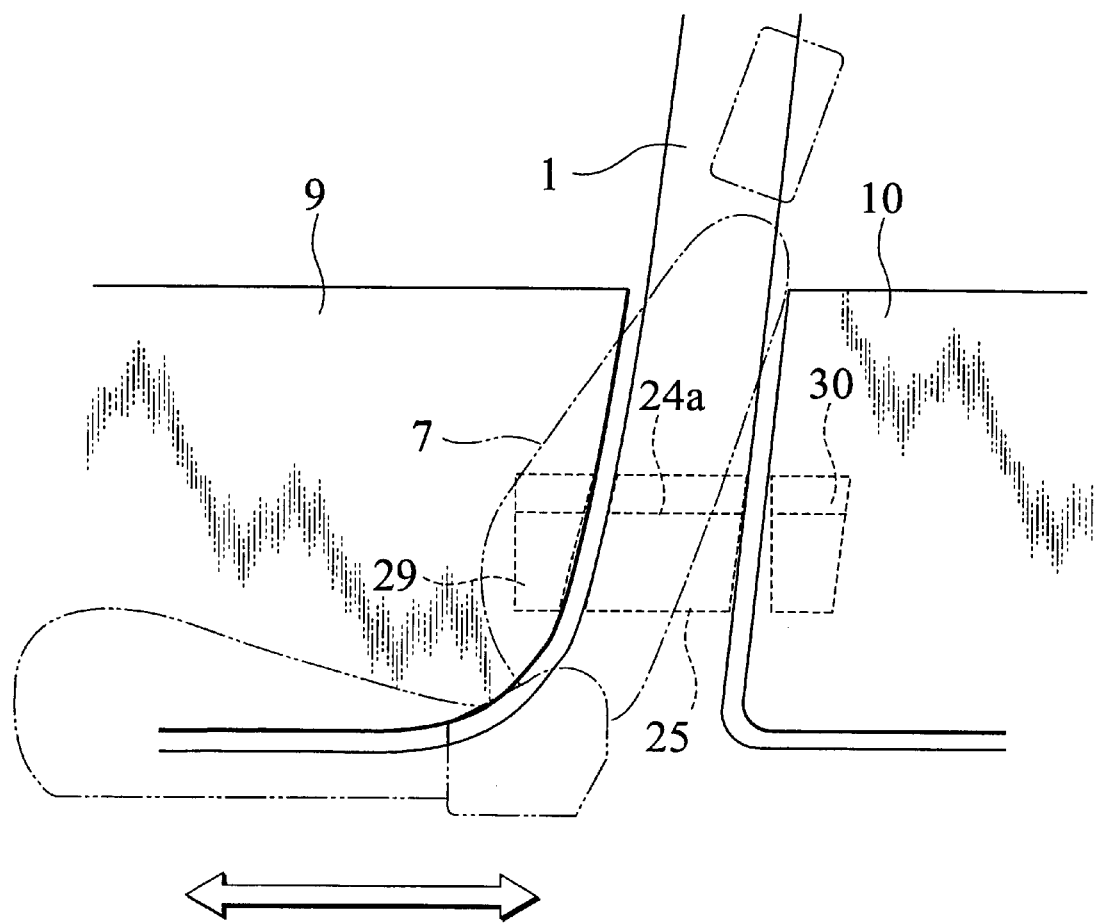
FIG. 4 is a side view of the side structure of the first embodiment, viewed from the lateral side of the vehicle body.
Figure 5:
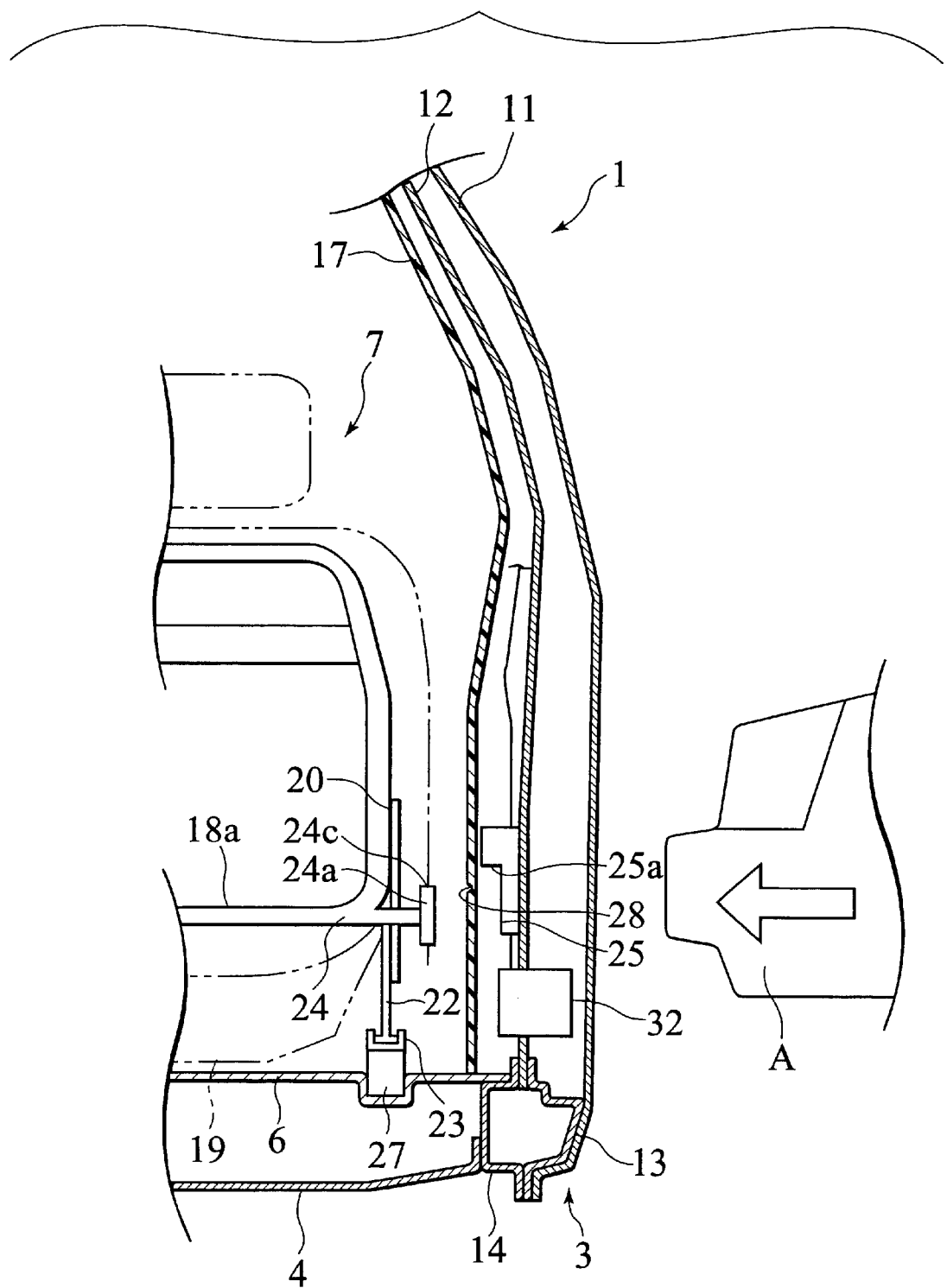
FIG. 5 is an enlarged sectional view of the essential part of the side structure of the first embodiment, showing its condition just before the vehicle's side collision.

Arranged between the pillar inner member 12 and the pillar garnish 17 is a projecting member (engagement member) 25 which operates as an engagement member attached to the center pillar 1, for engagement with the flat plate 24a of the member 24. In detail, the projecting member 25 is mounted on the inside face of the pillar inner member 12. The projecting member 25 is reversed L-shaped in view of the fore-and-aft direction of the vehicle and positioned so as to oppose the flat plate 24a of the load-direction converting member 24, generally in the vehicle's width direction. Further, the projecting member 25 is established so that its downward face 25a (i.e. lower end in engagement with the flat plate 24a) is higher than an uppermost end face 24c of the flat plate 24 (i.e. upper end in engagement with the member 25). It is preferably established that, as shown in FIG. 3, when "L1" represents a distance between the cross sectional center of the side sill 3 and the downward face 25a of the projecting member 25 and similarly, "L2" represents a distance between the cross sectional center of the side sill 3 and the uppermost end face 24c of the flat plate 24a, then the distance "L1" is equal to or somewhat larger than the distance "L2". More preferably, as shown with a broken line of FIG. 1, the projecting member 25 has an inward face 25c looking somewhat upward rather than extending vertically.

The projecting member 25 is provided, on the side of the inner pillar member 12, with a through-groove 25b for the passage of a seat belt 37 wound out of a seat belt winding unit 32 attached to the center pillar's part below the projecting member 25. The through-groove 25b is formed with a width broader than a width of the seat belt 37 so that the groove 25b would not interfere with the passage of the seat belt 37.

As shown in FIG. 1, the pillar garnish 17 has a weakened part 28 formed close to the projecting member 25 so as to extend in the fore-and-aft direction of the vehicle. In detail, the weakened part 28 is positioned below the downward face 25a. Further, the part 28 is positioned above or on a substantial level with the uppermost end face 24c of the flat plate 24a. The weakened part 28 may be formed by e.g. a locally-thinned wall in the pillar garnish 17. Without limiting its extension to the fore-and-aft direction only, the weakened part 28 may be formed to extend in an upward-and-downward direction or obliquely to both "fore-and-aft" and "upward-and-downward" directions. Further, the weakened part 28 is not necessarily formed underside of the projecting member 25. That is, as described later, any position will do so long as the so-positioned part 28 provides a chance for the load-direction converting member 24 to break off the pillar garnish 17 at the vehicle's side collision and as a result, the flat plate 24a of the member 24 can enter into the so-broken pillar garnish 17.

Similarly, the front door 9 and the rear door 10 have respective projecting members 29, 30 attached to inner door members 16 (although FIG. 1 shows the only one inner door member 16 for the front door 9, the rear door 10 has the inner door member 16 similarly). Having respective contours similar to the projecting member 25, these projecting members 29, 30 are also positioned on a level with the projecting member 25 attached to the inner pillar member 12. The projecting members 25, 29, 30 are arranged corresponding to a "moving" range (in the fore-and-aft direction) of the moving flat plate 24a of the load-direction converting member 24, which may be accompanied with the sliding movement of the seat, the reclining of the seat, etc. Additionally, a door trim 26 is also provided with a weakened part 31 which is similar to the part 28 in the pillar garnish 17.

Next, the operation of the side structure constructed above will be described with reference to FIGS. 5 to 9. When the side impact is inputted to the vehicle through its lateral side as a result that another vehicle A having a bumper at a high position collides with the lateral side of the vehicle, then the center pillar 1 tries to move to the passenger's room as if the pillar 1 were rotating about the cross sectional center of the side sill 3. Then, the front and rear doors 9, 10 also try to move to the passenger's room together with the center pillar 1. As soon as the outermost end of the load-direction converting member 24, namely, the flat plate 24a comes into contact with the pillar garnish 17, it is broken as the boundary of the weakened part 28, so that the load-direction converting member 24 enters into the pillar garnish 17. Note that, in the following descriptions, the outermost end of the load-direction converting member 24 is indicated with the same reference numeral as the flat plate (24a).

Figure 6:
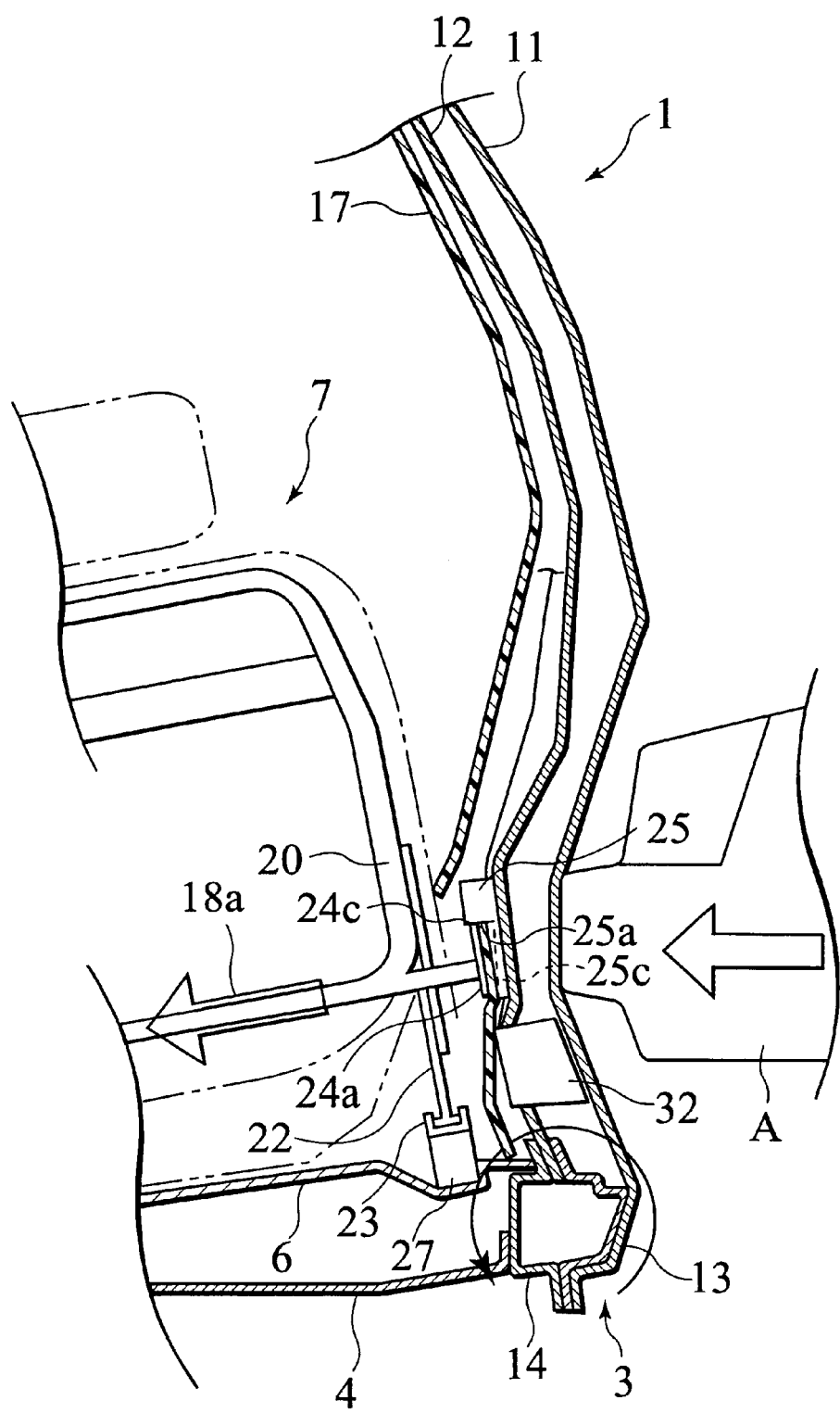
FIG. 6 is an enlarged sectional view of the essential part of the side structure of the first embodiment, showing a condition coming next to the condition of FIG. 5.

When the center pillar 1 further moves to the pillar garnish 17 direction with the progress of deformation of the vehicle, the projecting member 25 on the inner pillar member 12 finally engages with the outermost end 24a of the load-direction converting member 24 through the downward face 25a (FIG. 6).

Consequently, the load in the vehicle's width direction begins to be transmitted from the inner pillar member 12 to the load-direction converting member 24 in the seat 17. Additionally, with the deformation of the inner pillar member 12 while pivoting about the side sill 3, the projecting member 25 of the member 12 engages with the outermost end 24a of the load-direction converting member 24 from the upside downward. In the embodiment, as mentioned before, the inward face 25c of the projecting member 25 is formed so as to look somewhat upward rather than extending vertically. Consequently, even if the inner pillar member 12 rotates radically, an angle of the outermost end 24a of the load-direction converting member 24 with the inward face 25c gets smaller so that the outermost end 24a can engage with the downward face 25a of the projecting member 25 more smoothly and certainly. In this way, with the deformation of the inner pillar member 12, the load is exerted to the load-direction converting member 24, inward of the vehicle's width direction and obliquely downward. Owing to this load, the seat 7 is restrained from rotating upward forcibly. With the further progress in deformation of the vehicle body, the seat 7 moves toward the vehicle center in the vehicle's width direction together with the load-direction converting member 24. In process of this movement, when the seat 7 comes into contact with the floor tunnel 5 through the seat's part on the side of the vehicle's center, the load begins to be transmitted to the floor tunnel 5 (see FIG. 9). In brief, the load is transmitted from the inner pillar member 12 to the projecting member 25 and thereafter, the load (in the vehicle's width direction) is converted into an obliquely-downward load by the load-direction converting member 24 and successively transmitted from the inner end 24b of the member 24 to the floor tunnel 5 through the reclining device 21. In this way, it is possible to complete the load transmission to the floor tunnel 5 as one vehicle's framework through the seat 7 as a medium.

Figure 7:
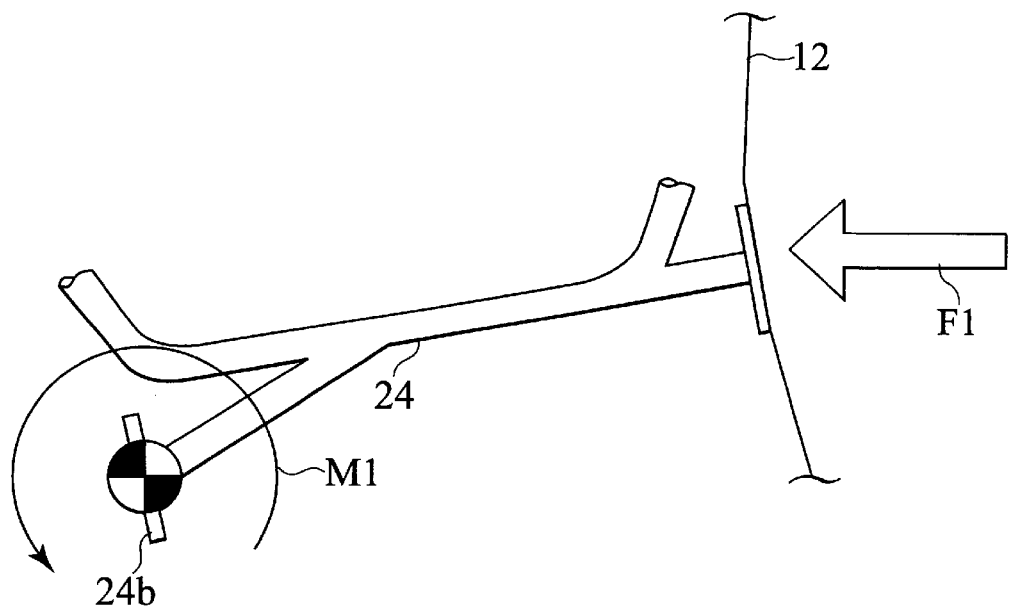
FIG. 7 is a view showing a load and a moment both acting on a load-directional transmitting member of the prior art at the side collision.
Figure 8:
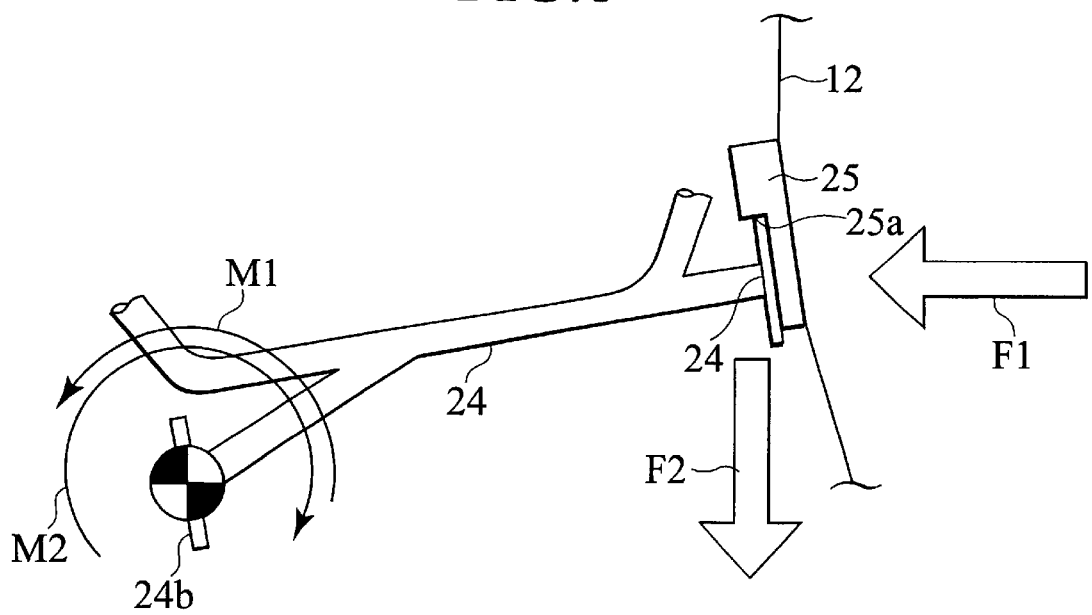
FIG. 8 is a view showing a load and a moment both acting on a load-directional transmitting member of the first embodiment at the side collision.
Figure 9:
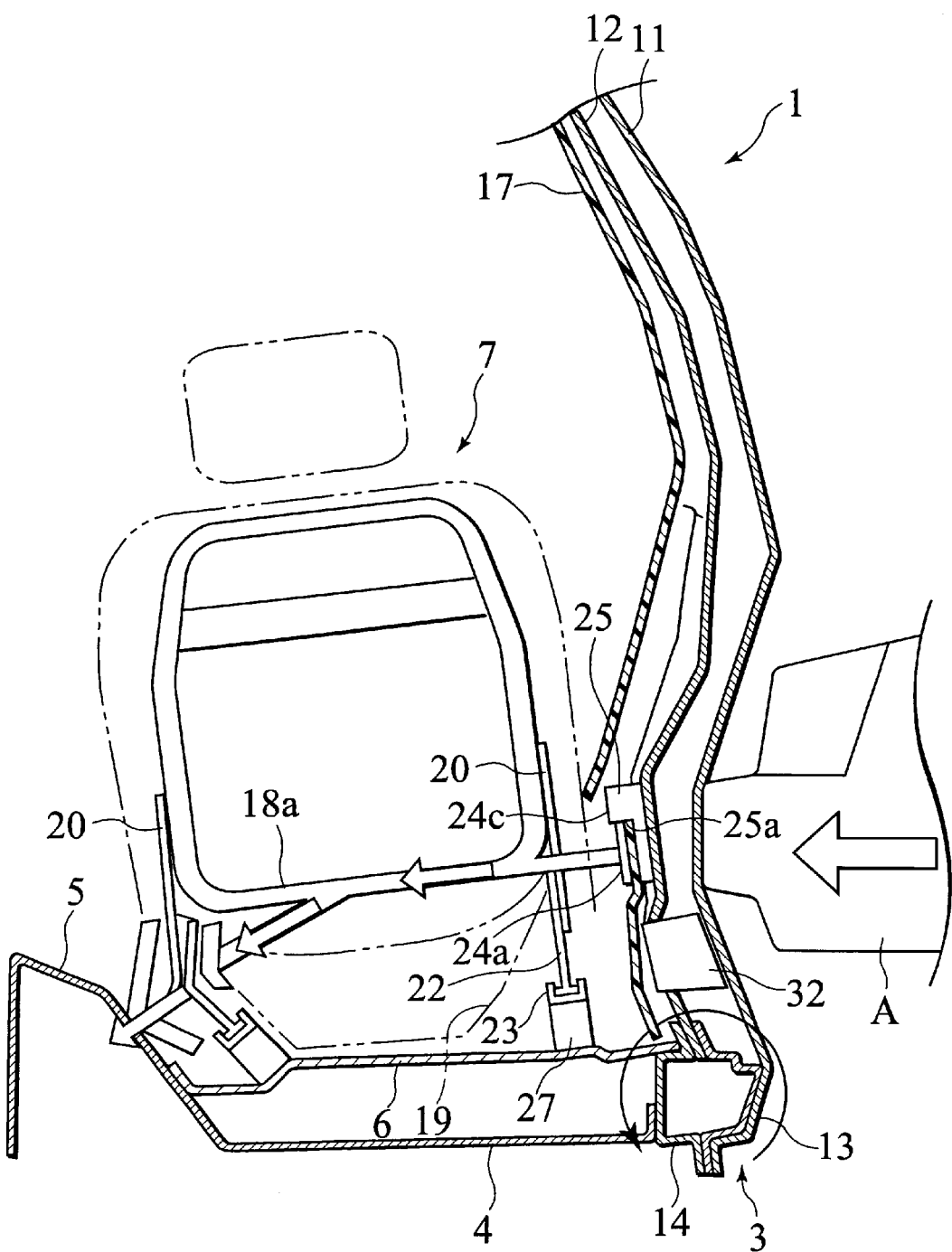
FIG. 9 is an enlarged sectional view of the essential part of the side structure of the first embodiment, showing a load transmission at the vehicle's side collision.

As shown in FIG. 7, in case of providing no projecting member on the inner pillar member 12, a moment M1 (in the counter-clockwise direction in the drawing and about the inner end 24b) is generated in the load-direction converting member 24 in the seat 7 by the side impact F1. While, in case of providing the projecting member 25 on the inner pillar member 12 as shown in FIG. 8, a moment M2 is also generated besides the above moment M1 by the downward load F2 resulting from the engagement of the outermost end 24a with the projecting member 25 and also acting on the outermost end 24a through the downward face 25a of the member 25. As the direction of the moment M2 is opposite to that of the moment M1, the resultant moment acting on the load-direction converting member 24 can be decreased in comparison with the former case of providing no projecting member. With this operation, the load-direction converting member 24 has only to possess enough strength to endure the so-reduced resultant moment, accomplishing the provision of lightweight seat structure.

Although the above explanation of the operation takes example by the engagement of the projecting member 25 on the inner pillar member 12 with the load-direction converting member 24, the similar operation may be effected in respective cases of engaging the projecting members 29, 30 on the inner door members 16 with the member 24.

[2nd. Embodiment]

Figure 10:
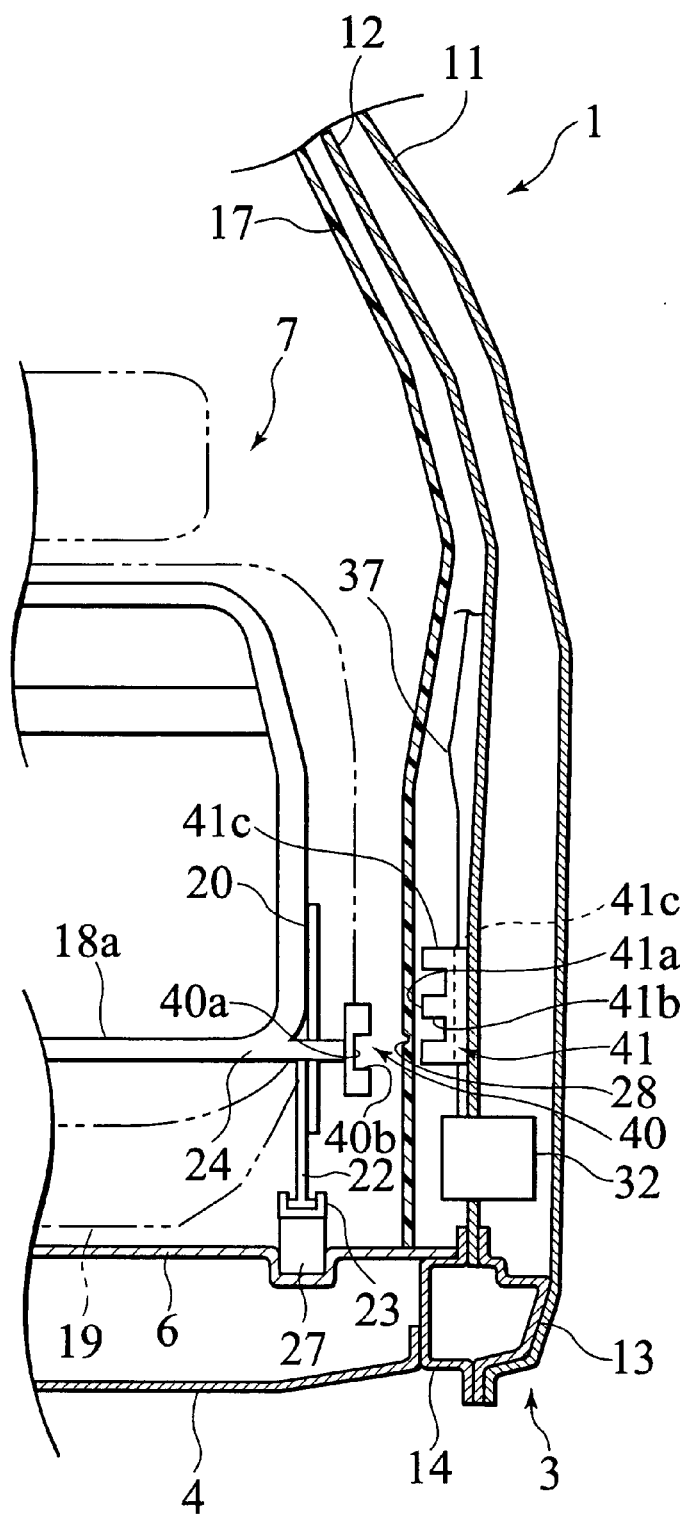
FIG. 10 is a sectional view of the essential part of the side structure of the second embodiment, viewed from the front side of the vehicle body.
Figure 11:
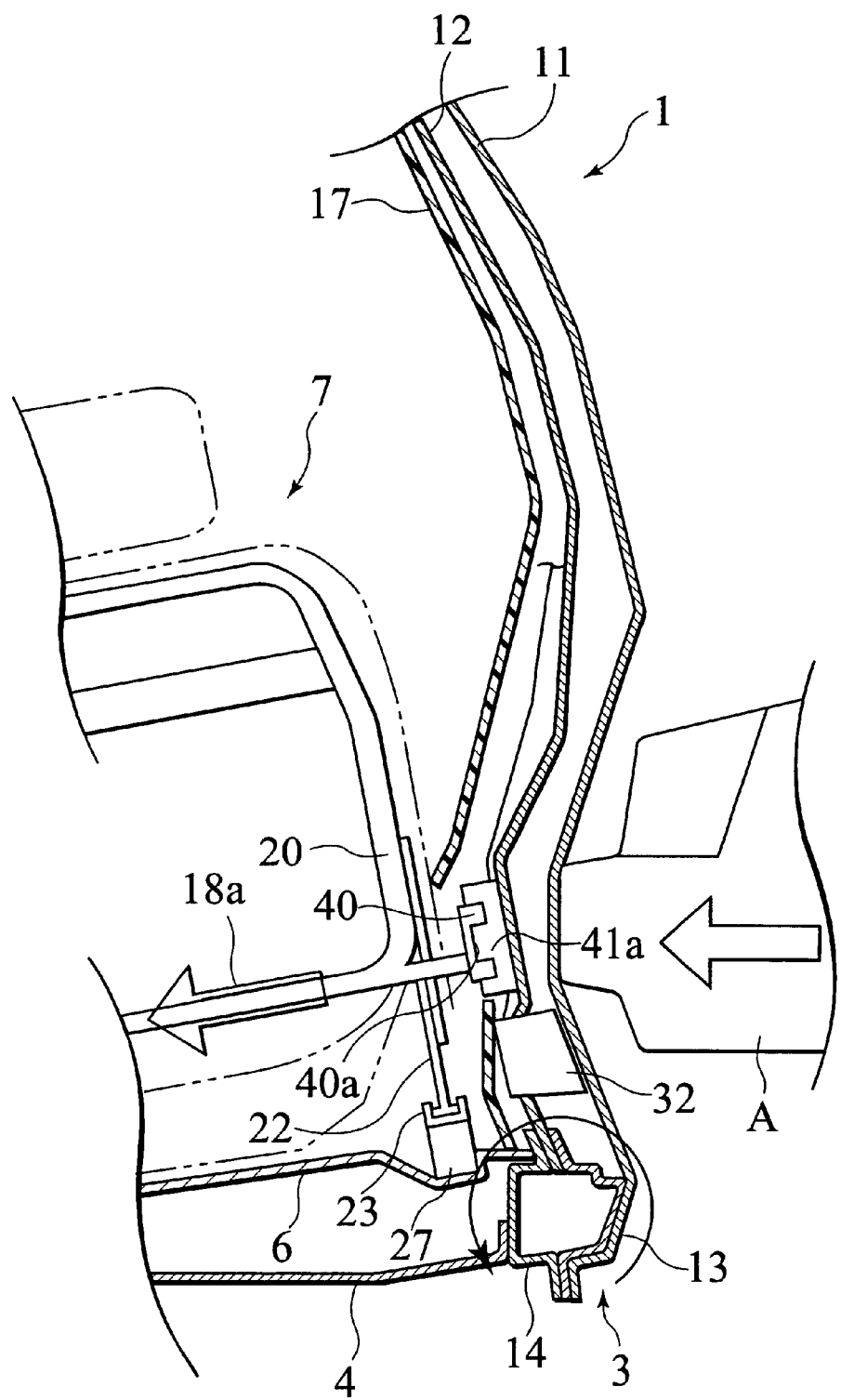
FIG. 11 is a sectional view of the essential part of the side structure of the second embodiment, viewed from the front side of the vehicle body at the side collision.

FIGS. 10 and 11 show the second embodiment of the present invention. Note that, in this embodiment, elements identical to those in the first embodiment will be indicated with the same reference numerals respectively and their overlapping descriptions are eliminated. According to the embodiment, the load-direction converting member 24 has a depressed member 40 fixed on the outer end of the member 24 of the vehicle's width direction. Being provided with at least one depression 40a, the depressed member 40 serves as the previous flat plate 24a of the first embodiment. Further in place of the projecting member 25 of the first embodiment, an engagement member 41 is attached to the inner pillar member 12 of the center pillar 1, at a position opposing the depressed member 40 in the vehicle's width direction. The engagement member 41 has a projection 41a capable of fitting the depression 40a of the depressed member 40. The engagement member 41 is established so that its downward face 41a (i.e. lower end of the projection 41a in engagement with the depression 40a) is higher than an upward face 40b of the depression 40a (i.e. lower end of the depression 40a in engagement with the member 41). More preferably, as similar to the first embodiment, a distance between the cross sectional center of the side sill 3 and the downward face 41b of the projection 41a is equal to or somewhat larger than a distance between the cross sectional center of the side sill 3 and the upward face 40b.

The engagement member 41 is provided, on the side of the inner pillar member 12, with a through-groove 41c for allowing the seat belt 37 to pass. The through-groove 41c is formed with a width broader than a width of the seat belt 37 so that the groove 41c would not interfere with the passage of the seat belt 37. As similar to the first embodiment, the pillar garnish 17 has the weakened part 28 formed close to the engagement member 41 so as to extend in the fore-and-aft direction of the vehicle. In detail, the weakened part 28 is formed below the downward face 41b of the projection 41a. Simultaneously, the part 28 is positioned above or on a substantial level with the depression 40a of the depressed member 40 fixed on the outer end of the member 24.

The operation of the second embodiment is as follows. When the impact load is applied (inputted) on the lateral side of the vehicle due to the side collision, then the center pillar 1 is deformed as if to rotate similarly to the first embodiment and tries to move to the passenger's room. With the progress of deformation of the center pillar 1, when the depressed member 40 on the outer end of the member 24 comes into contact with the pillar garnish 17, it begins to be broken through the boundary of the weakened part 28. Subsequently, with the further deformation of the vehicle body, the projection 41a of the engagement member 41 of the center pillar 1 engages with the depression 40a of the depressed member 40 (see FIG. 11).

Accordingly, with the similar effect to the first embodiment, it is possible to restrict the rotation of the seat 7 forcibly and also possible to transmit the load from the vehicle side to the floor tunnel 5 through the load-direction converting member 24. Furthermore, it is possible to reduce the moment generating in the load-direction converting member 24.

Owing to the adoption of the structure where the depression 40a of the depressed member 40 is engageable with the projection 41a of the engagement member 41, once the former engages with the latter, the completed engagement will be maintained certainly. Note that the load-direction converting member 24 may be provided with a member having one or more projections, while the engagement member 41 has one or more depressions formed for engagement with the projection(s) of the member 24.

Besides the engagement member 41 on the inner pillar member 12, the inner door member 16 may be also provided with the similar engagement member.

[3rd. Embodiment]

Figure 12:
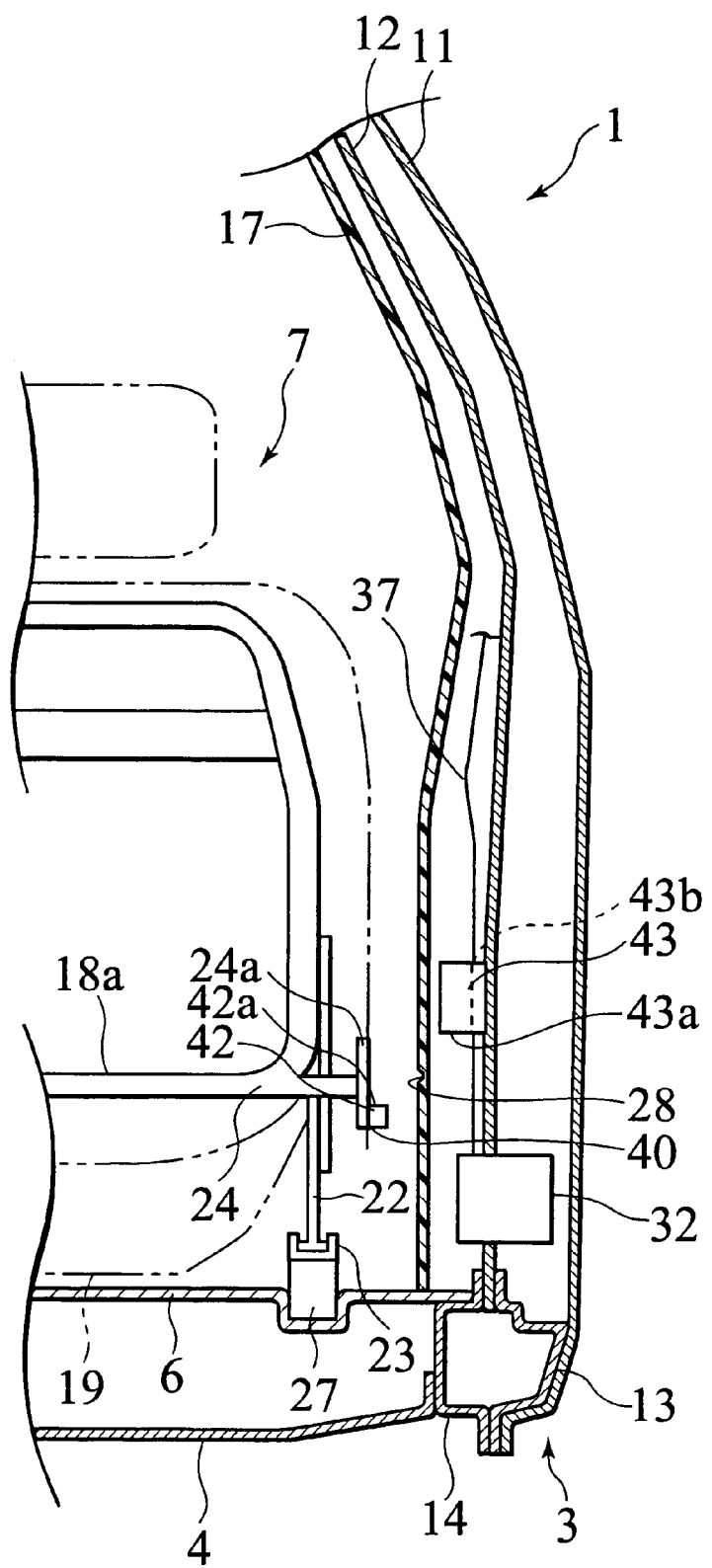
FIG. 12 is a sectional view of the essential part of the side structure of the third embodiment, viewed from the front side of the vehicle body.
Figure 13:
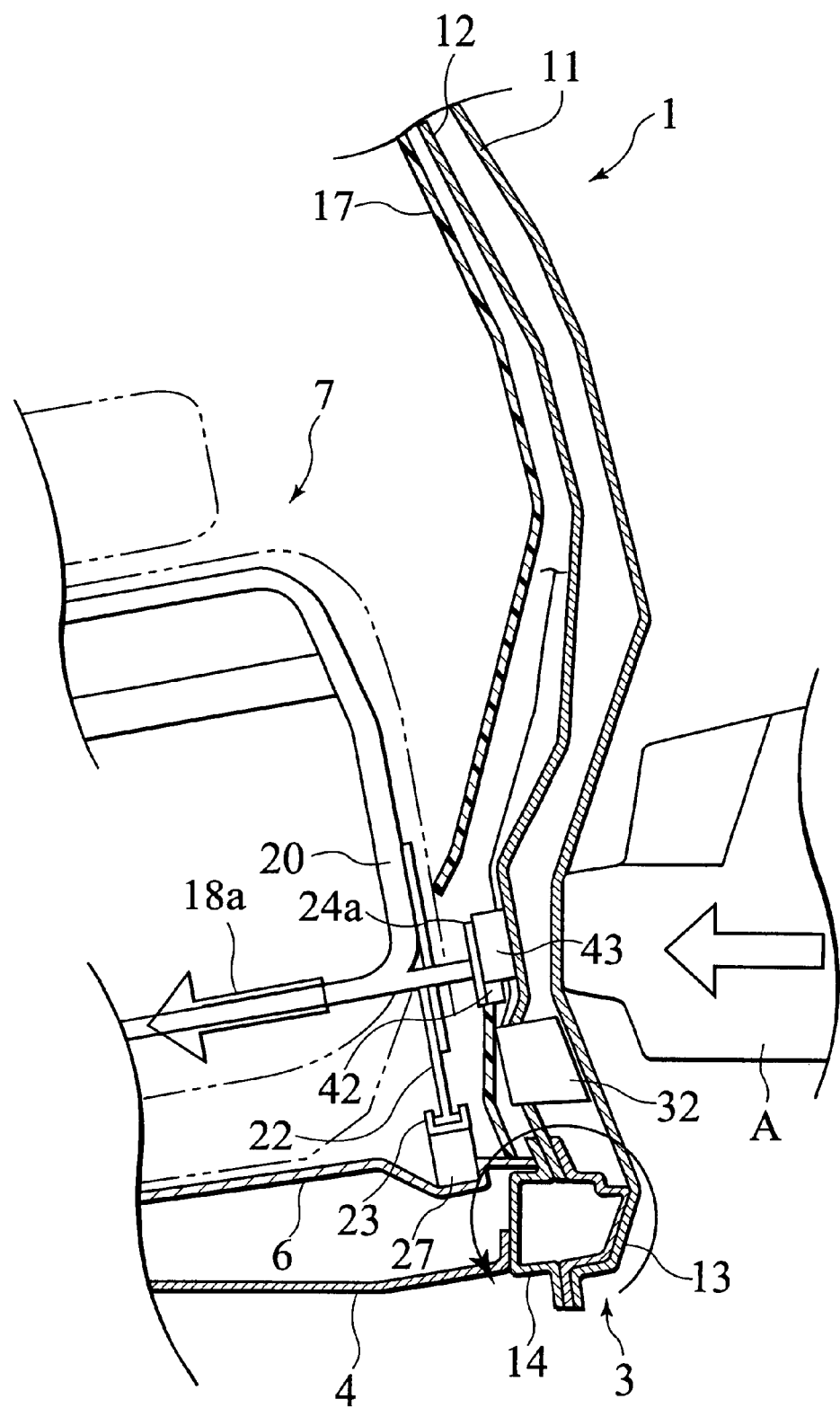
FIG. 13 is a sectional view of the essential part of the side structure of the third embodiment, viewed from the front side of the vehicle body at the side collision.

FIGS. 12 and 13 show the third embodiment of the present invention. Note that, in this embodiment, elements identical to those in the first embodiment will be indicated with the same reference numerals respectively and their overlapping descriptions are eliminated. According to the embodiment, the load-direction converting member 24 is provided, on the outer end, with the flat plate 24a (of the first embodiment) and a block member (projection) 42 projecting from the lower end of the plate 24a outward, exhibiting a reversed-L shaped configuration in view of the fore-and-aft direction of the vehicle. Further in place of the projecting member 25 of the first embodiment, an projecting member 43 is attached to the inner pillar member 12 of the center pillar 1 so as to oppose the block member 42 in the vehicle's width direction. Although the projecting member 43 may be revered-L shaped similarly to the first embodiment, it is not always formed to have such a configuration. That is, as shown in the figure, the projecting member 43 may be shaped to be rectangular in view of the fore-and-aft direction of the vehicle. The projecting member 43 is established so that its downward face 43a (i.e. lower end of the member 43 in engagement with the block member 42) is higher than an upward face 42b of the block member 42 (i.e. upper end of the member 42 in engagement with the member 43). More preferably, as similar to the first embodiment, a distance between the cross sectional center of the side sill 3 and the downward face 43a of the projecting member 43 is equal to or somewhat larger than a distance between the cross sectional center of the side sill 3 and the upward face 42b.

The projecting member 43 is provided, on the side of the inner pillar member 12, with a through-groove 43b for allowing the seat belt 37 to pass. The through-groove 43b is formed with a width broader than the width of the seat belt 37 so that the groove 43b would not interfere with the passage of the seat belt 37. As similar to the first embodiment, the pillar garnish 17 has the weakened part 28 formed close to the projecting member 43 so as to extend in the fore-and-aft direction of the vehicle. In detail, the weakened part 28 is formed below the downward face 43a of the projecting member 43. Simultaneously, the part 28 is positioned above or on a substantial level with the upward face 42a of the block member 42 on the outer end (flat plate) 24a of the member 24.

The operation of the third embodiment is as follows. When the impact load is applied (inputted) on the lateral side of the vehicle due to the side collision, then the center pillar 1 is deformed as if to rotate similarly to the first embodiment and tries to move to the passenger's room. With the progress of deformation of the center pillar 1, when the block member 42 on the outer end of the member 24 comes into contact with the pillar garnish 17, it begins to be broken through the boundary of the weakened part 28. Subsequently, with the further deformation of the vehicle body, the block member 42 on the outer end of the member 24 engages with the projecting member 43 on the center pillar 1, from the underside of the member 43 through the upward face 43a (see FIG. 13).

Accordingly, with the similar effect to the first embodiment, it is possible to restrict the rotation of the seat 7 forcibly and also possible to transmit the load from the vehicle side to the floor tunnel 5 through the load-direction converting member 24. Furthermore, it is possible to reduce the moment generating in the load-direction converting member 24.

Besides the projecting member 43 on the inner pillar member 12, the inner door member 16 may be also provided with the similar projecting member.

[4th. Embodiment]

Figure 14:
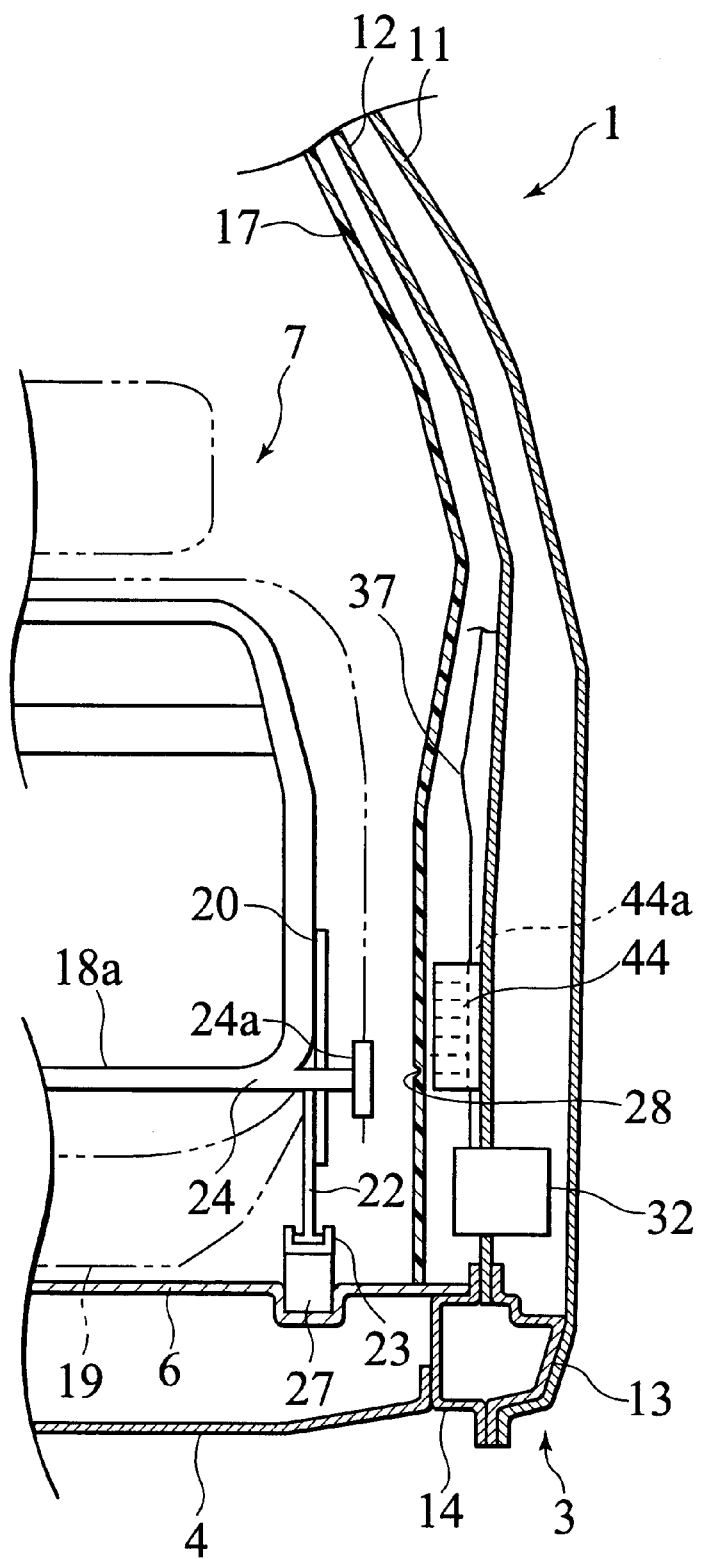
FIG. 14 is a sectional view of the essential part of the side structure of the fourth embodiment, viewed from the front side of the vehicle body.
Figure 15:
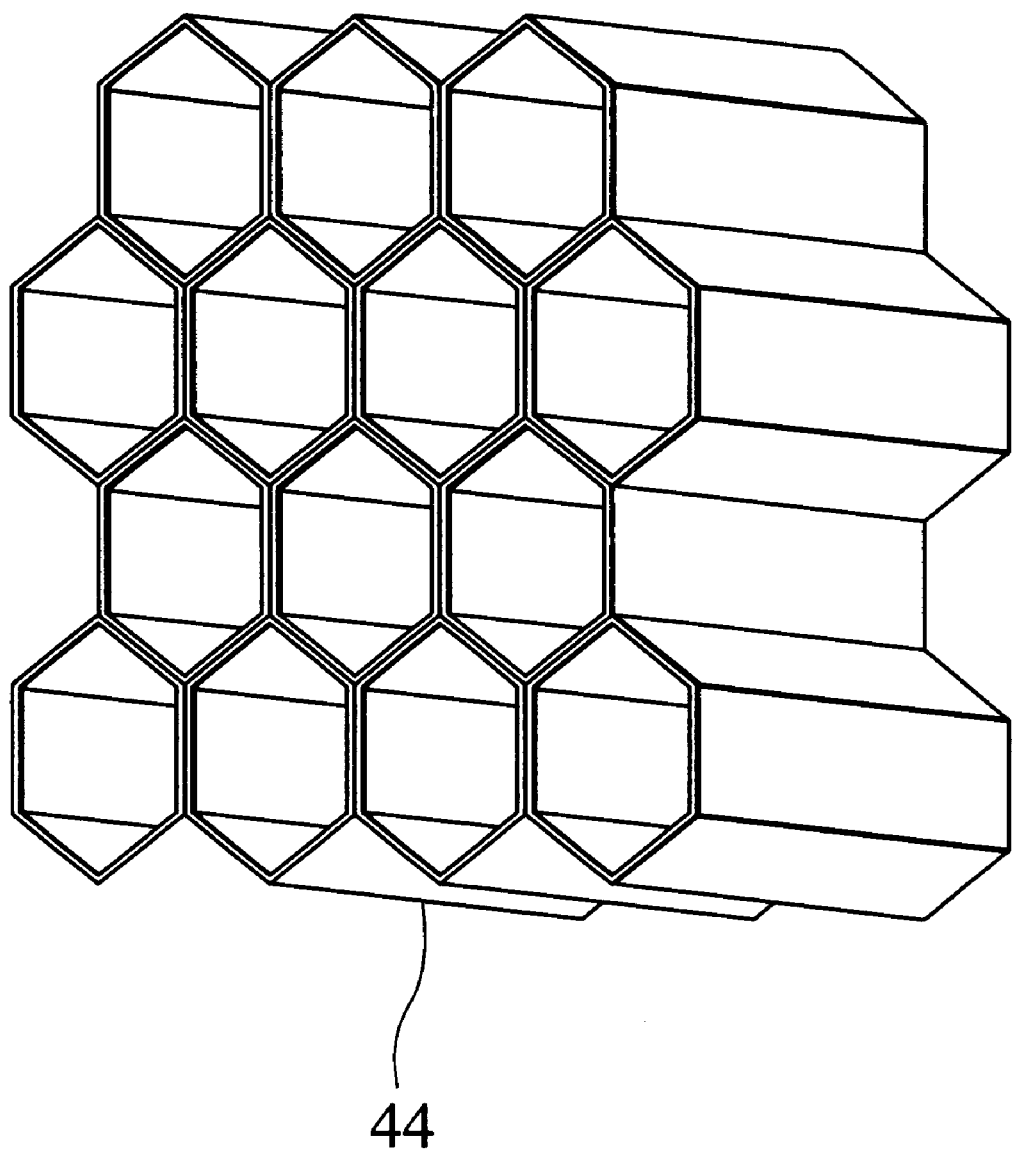
FIG. 15 is a perspective view showing an engagement member of the fourth embodiment.
Figure 16:
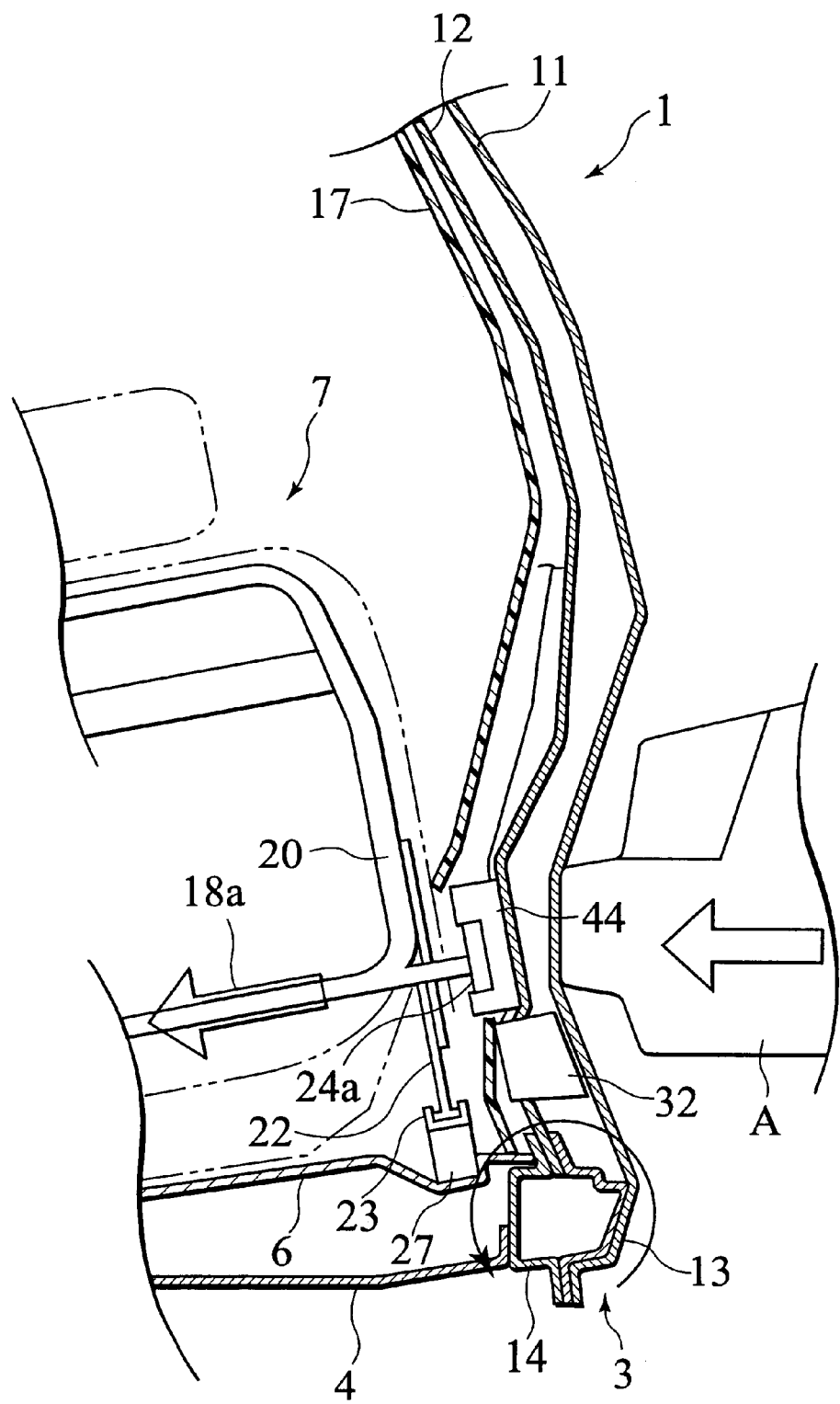
FIG. 16 is a sectional view of the essential part of the side structure of the fourth embodiment, viewed from the front side of the vehicle body at the side collision.

FIGS. 14 to 16 show the fourth embodiment of the present invention. Note that, in this embodiment, elements identical to those in the first embodiment will be indicated with the same reference numerals respectively and their overlapping descriptions are eliminated. According to the embodiment, an engagement member 44 is arranged so as to oppose the outermost end 24a of the load-direction converting member 24. This engagement member 44 is formed so as to extend along the lateral side of the passenger's room to the "fore-and-aft" and "upward-and-downward" directions of the vehicle body and also attached to the inner pillar member 12 of the center pillar 1 in plane. Additionally, the engagement member 44 is adapted so as to be locally deformable in the vehicle's width direction due to the depression by the outermost end 24a of the member 24. That is, the engagement member 44 is provided with its rigidity in the "fore-and-aft" and "upward-and-downward" directions of the vehicle, which is sufficiently higher than the rigidity in its "buckling" direction (i.e. vehicle's width direction). In detail, the member 44 may be in the form of a resinous honeycomb member, as shown in FIG. 15. Then, in arrangement, the honeycomb member 44 is arranged so that respective hexagonal sections bristle in parallel with the "fore-and-aft" and "upward-and-downward" directions of the vehicle.

As similar to the first embodiment, the engagement member 44 is positioned so that a distance between the cross sectional center of the side sill 3 and the member 44 is equal to or somewhat larger than a distance between the cross sectional center of the side sill 3 and the outer end (flat plate) 24a.

The engagement member 44 is provided, on the side of the inner pillar member 12, with a through-groove 44a for allowing the seat belt 37 to pass. The through-groove 44a is formed with a width broader than the width of the seat belt 37 so that the groove 44a would not interfere with the passage of the seat belt 37. As similar to the first embodiment, the pillar garnish 17 is also provided with the weakened part 28 in the vicinity of the engagement member 44, namely, at a position opposing both of the engagement member 44 and the outermost end 24a of the member 24 in the vehicle's width direction.

The operation of the fourth embodiment is as follows. When the impact load is applied (inputted) on the lateral side of the vehicle due to the side collision, then the center pillar 1 is deformed as if to rotate similarly to the first embodiment and tries to move to the passenger's room. With the progress of deformation of the center pillar 1, when the outermost end 24a of the member 24 comes into contact with the pillar garnish 17, it begins to be broken through the boundary of the weakened part 28. Subsequently, with the further deformation of the vehicle body, the outermost end 24a of the member 24 comes into contact with the engagement member 44 for depression. Thus, the local portion of the member 44 is compressively deformed so as to follow the contour of the outermost end 24a. Therefore, the engagement member 44 is formed with a step between its compressed part due to the depression by the outermost end 24a and the remaining non-compressed part, so that the member 24 finally engages with the engagement member 44 (FIG. 16).

Accordingly, with the similar effect to the first embodiment, it is possible to restrict the rotation of the seat 7 forcibly and also possible to transmit the load from the vehicle side to the floor tunnel 5 through the load-direction converting member 24. Furthermore, it is possible to reduce the moment generating in the load-direction converting member 24. Besides the engagement member 44 on the inner pillar member 12, the inner door member 16 may be also provided with the similar engagement member.

[5th. Embodiment]

Figure 17:
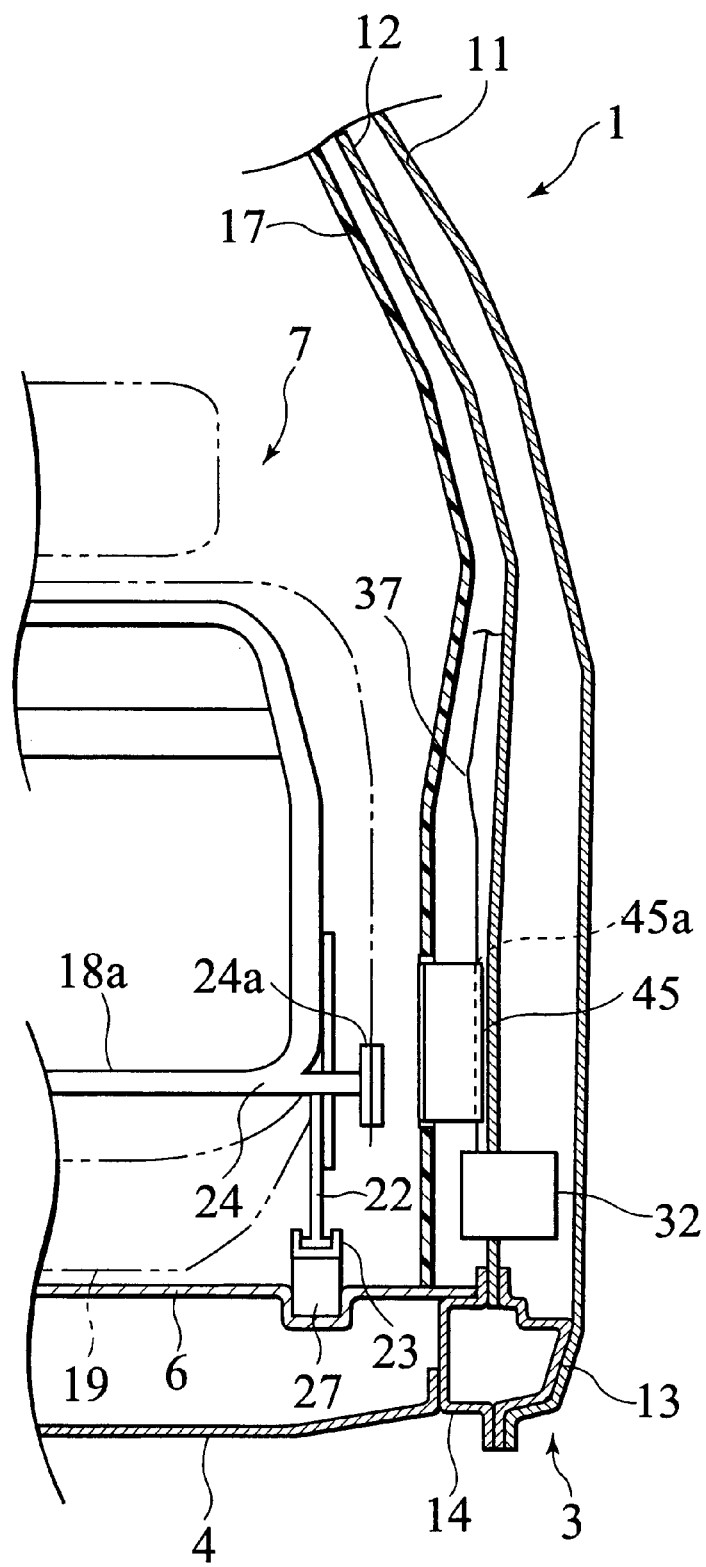
FIG. 17 is a sectional view of the essential part of the side structure of the fifth embodiment, viewed from the front side of the vehicle body.
Figure 18:
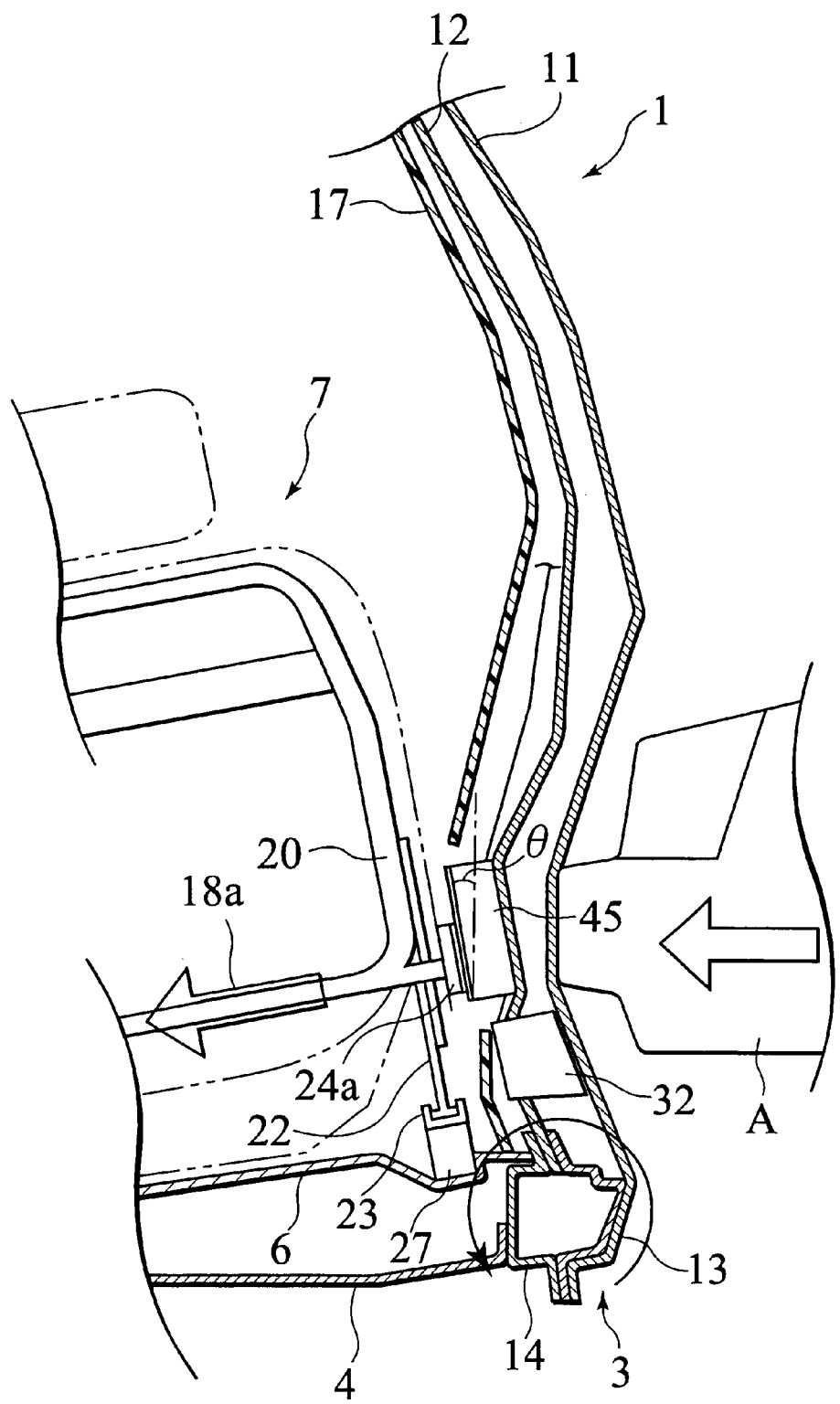
FIG. 18 is a sectional view of the essential part of the side structure of the fifth embodiment, viewed from the front side of the vehicle body at the side collision.

FIGS. 17 and 18 show the fifth embodiment of the present invention. Note that, in this embodiment, elements identical to those in the first embodiment will be indicated with the same reference numerals respectively and their overlapping descriptions are eliminated. According to the embodiment, an engagement member 45 is arranged so as to face the passenger's room through an opening formed in the pillar garnish 17. The engagement member 45 has a higher frictional surface formed to oppose the outermost end 24a of the load-direction converting member 24 in the vehicle's width direction. Additionally, the outermost end 24a of the load-direction converting member 24 is also provided with a higher frictional face opposing the engagement member 45.

The engagement member 45 is provided, on the side of the inner pillar member 12, with a through-groove 45a for allowing the seat belt 37 to pass. The through-groove 45a is formed with a width broader than the width of the seat belt 37 so that the groove 45a would not interfere with the passage of the seat belt 37.

The operation of the fifth embodiment is as follows. When the impact load is applied (inputted) on the lateral side of the vehicle due to the side collision, then the center pillar 1 is deformed as if to rotate similarly to the first embodiment and tries to move to the passenger's room. With the progress of deformation of the center pillar 1, at a point of time when the outermost end 24a of the member 24 comes into contact with the engagement member 45, there is produced a higher frictional force between both higher frictional faces of the members 24, 45. Under this frictional force, the outermost end 24a of the member 24 engages with the engagement member 45 (see FIG. 18).

In view of ensuring a sufficient friction therebetween, it is desirable to select the combination of surface materials providing a frictional coefficient to meet the relationship of $\mu > \tan\theta$ wherein "$\theta$" represents an angle made by the contact surface(s) at the maximum reaction from the floor tunnel 5 with respect to the upward-and-downward direction and "$\mu$" is a frictional coefficient.

Accordingly, with the similar effect to the first embodiment, it is possible to restrict the rotation of the seat 7 forcibly and also possible to transmit the load from the vehicle side to the floor tunnel 5 through the load-direction converting member 24. Furthermore, it is possible to reduce the moment generating in the load-direction converting member 24.

Although both of the outermost end 24a of the member 24 and the engagement member 45 have the higher frictional surfaces in the above-mentioned embodiment, either one of the members 24, 45 may include a higher frictional surface in the modification. Alternatively, in place of the engagement member 45 attached to the inner pillar member 12, the surface of the pillar garnish 17, which opposes the outermost end 24a of the load-direction converting member 24 in the vehicle's width direction, may be formed with a higher frictional coefficient. Or again, the pillar garnish 17 may be equipped with a higher frictional member, such as rubber belt, in order to prevent the pillar garnish 17 from being lifted against the inner pillar member 12.

Besides the engagement member 45 on the inner pillar member 12, the inner door member 16 may be also provided with the similar engagement member.

[6th. Embodiment]

Figure 19:
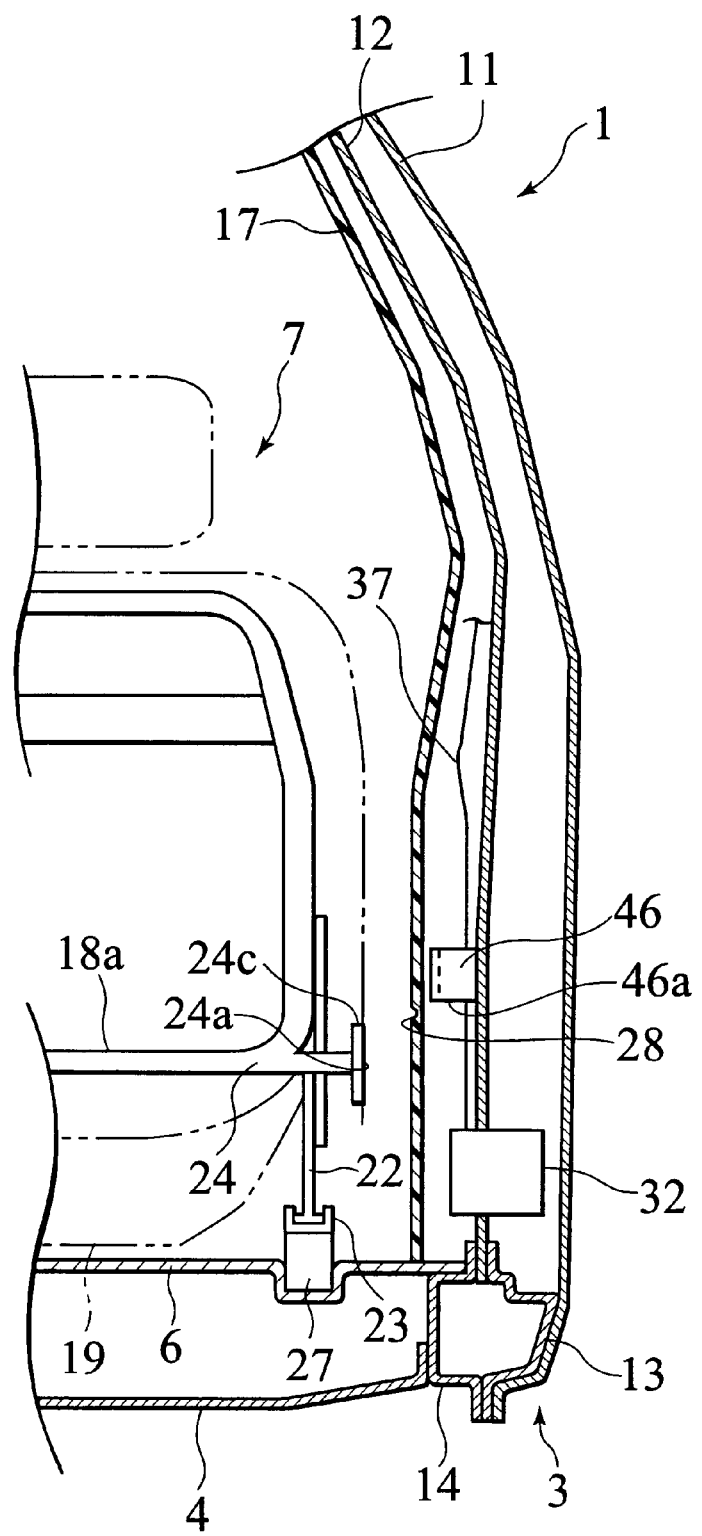
FIG. 19 is a sectional view of the essential part of the side structure of the sixth embodiment, viewed from the front side of the vehicle body.
Figure 20:
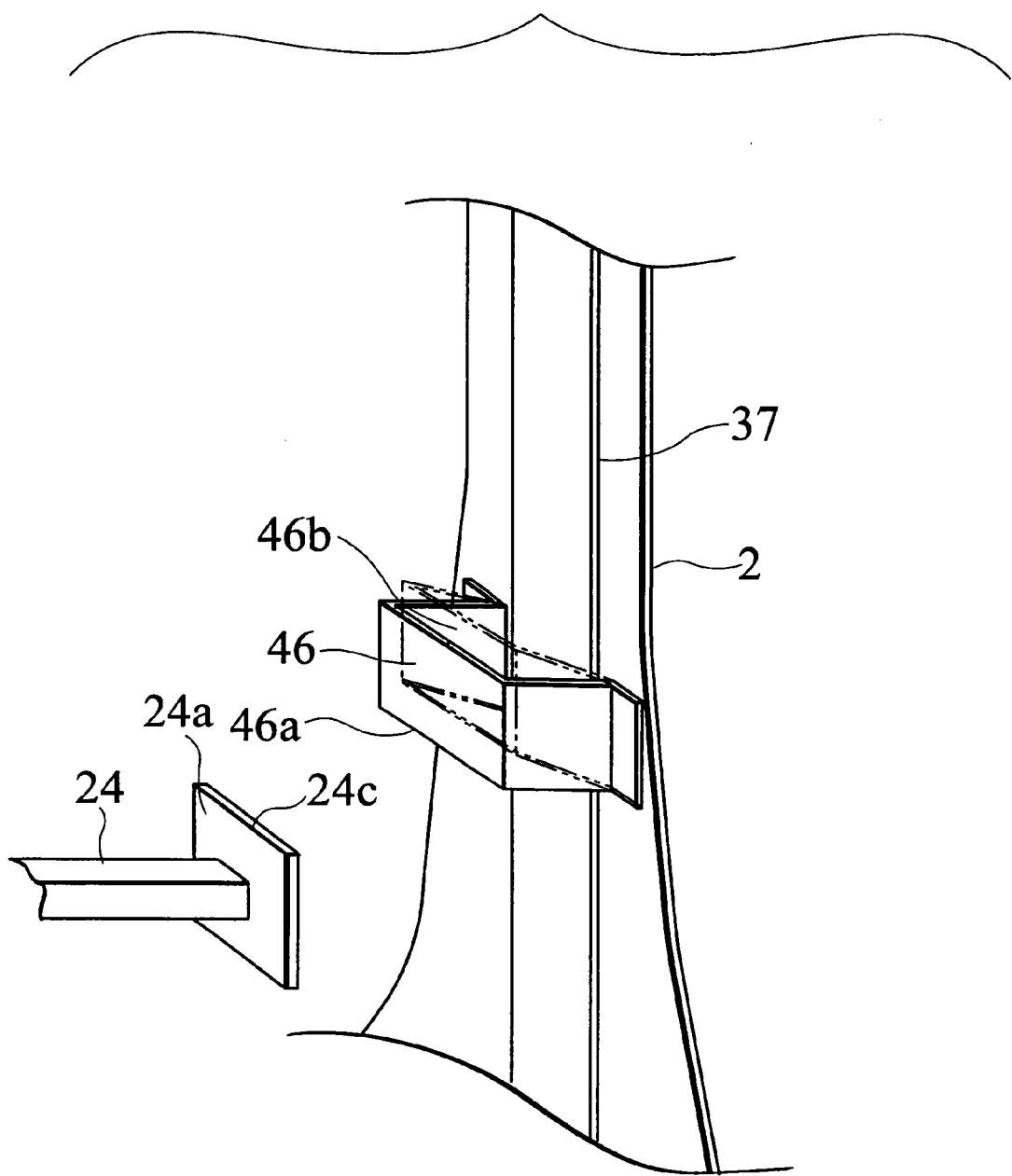
FIG. 20 is a perspective view showing an engagement member of the sixth embodiment.
Figure 21:
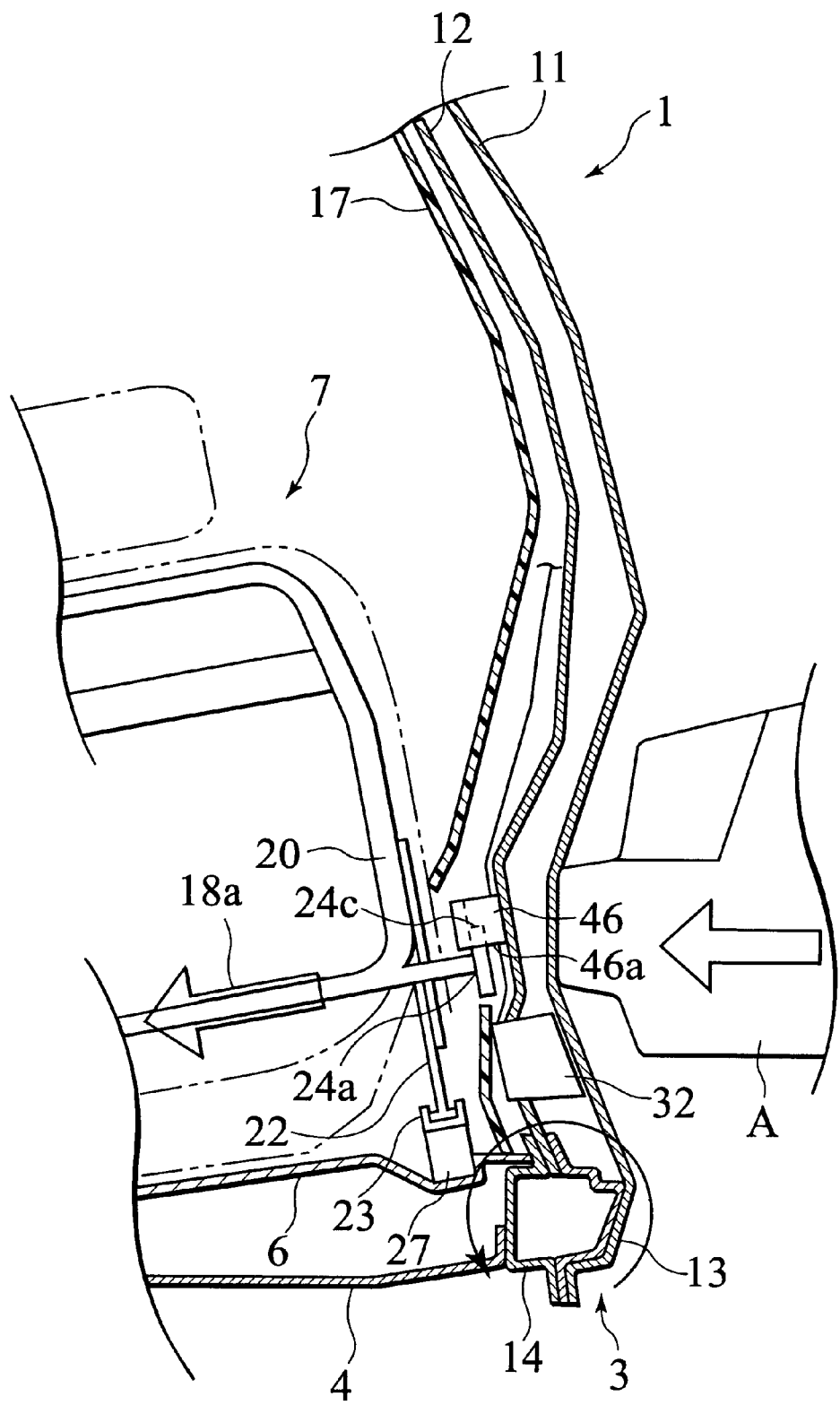
FIG. 21 is a sectional view of the essential part of the side structure of the sixth embodiment, viewed from the front side of the vehicle body at the side collision.

FIGS. 19 to 21 show the sixth embodiment of the present invention. Note that, in this embodiment, elements identical to those in the first embodiment will be indicated with the same reference numerals respectively and their overlapping descriptions are eliminated. According to the embodiment, an engagement member 46 is attached to the inner pillar member 12. By bending a piece of flat plate, the engagement member 46 is formed to have a substantial-hat shaped cross section and extend in the upward-and-downward direction, providing a closed-sectional structure 46b together with the inner pillar member 12. The engagement member 46 is positioned so that its lowermost opening 46a (i.e. lower end of the member 46 in engagement with the member 24) is higher than an uppermost end face 24c of the flat plate 24a (i.e. upper end of the member 24 in engagement with the member 46). More preferably, as similar to the first embodiment, a distance between the cross sectional center of the side sill 3 and the opening 46a of the engagement member 46 is equal to or somewhat larger than a distance between the cross sectional center of the side sill 3 and the uppermost end face 24c. Further, the flat plate 24a is formed to have a width smaller than an inside width of the closed-sectional structure 46b, allowing the upper part of the flat plate 24a to be inserted into the closed-sectional structure 46b through the opening 46a.

The seat belt 37 is also arranged so as to pass through the closed-sectional structure 46b. In this view, the inside width of the closed-sectional structure 46b is broader than the width of the seat belt 37 so that the groove 43b would not interfere with the passage of the seat belt 37. As similar to the first embodiment, the pillar garnish 17 has the weakened part 28 formed close to the engagement member 46 so as to extend in the fore-and-aft direction of the vehicle. In detail, the weakened part 28 is formed below the lowermost opening 46a of the engagement member 46. Simultaneously, the part 28 is positioned above or on a substantial level with the top of the flat plate 24a of the member 24.

The operation of the sixth embodiment is as follows. When the impact load is applied (inputted) on the lateral side of the vehicle due to the side collision, then the center pillar 1 is deformed as if to rotate similarly to the first embodiment and tries to move to the passenger's room. With the progress of deformation of the center pillar 1, when the flat plate 24a on the outer end of the member 24 comes into contact with the pillar garnish 17, it begins to be broken through the boundary of the weakened part 28. Subsequently, with the further deformation of the vehicle body, the top of the flat plate 24a of the member 24 is fitted into the closed-sectional structure 46b of the engagement member 46, accomplishing the engagement between the flat plate 24a and the engagement member 46 (see FIG. 21).

Accordingly, with the similar effect to the first embodiment, it is possible to restrict the rotation of the seat 7 forcibly and also possible to transmit the load from the vehicle side to the floor tunnel 5 through the load-direction converting member 24. Furthermore, it is possible to reduce the moment generating in the load-direction converting member 24.

Repeatedly, the engagement member 46 is formed to have a hat-shaped cross section. Thus, even if an object hits on the engagement member 46 at the vehicle's collision, the member 46 only inclines in the fore-and-aft direction with the deformation of cross-section (shown with imaginary lines of FIG. 20), whereby it is possible to absorb the impact energy exerted to the object.

Furthermore, since the top part of the flat plate 24a on the outer end of the load-direction converting member 24 is fitted into the closed-sectional structure 46b having the engagement member 46 and the inner pillar member 12, the engagement between the flat plate 24a and the engagement member 46 could be certainly maintained in spite of the subsequent occurrence of relative displacements (in the vehicle's width direction or in the fore-and-aft direction) between the member 24 and the engagement member 46.

Besides the engagement member 46 on the inner pillar member 12, the inner door member 16 may be also provided with the similar engagement member.

[7th. Embodiment]

Figure 22:
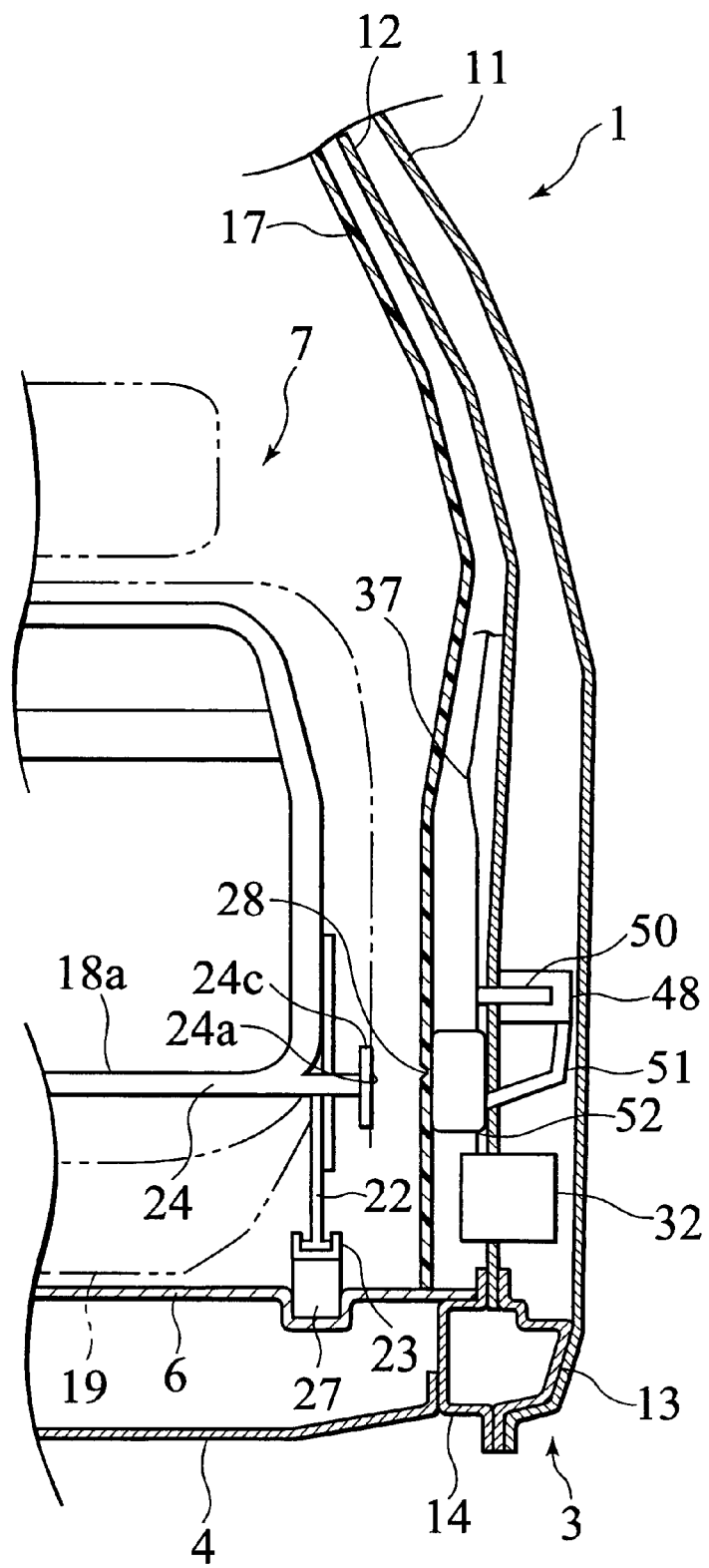
FIG. 22 is a sectional view of the essential part of the side structure of the seventh embodiment, viewed from the front side of the vehicle body.
Figure 23:
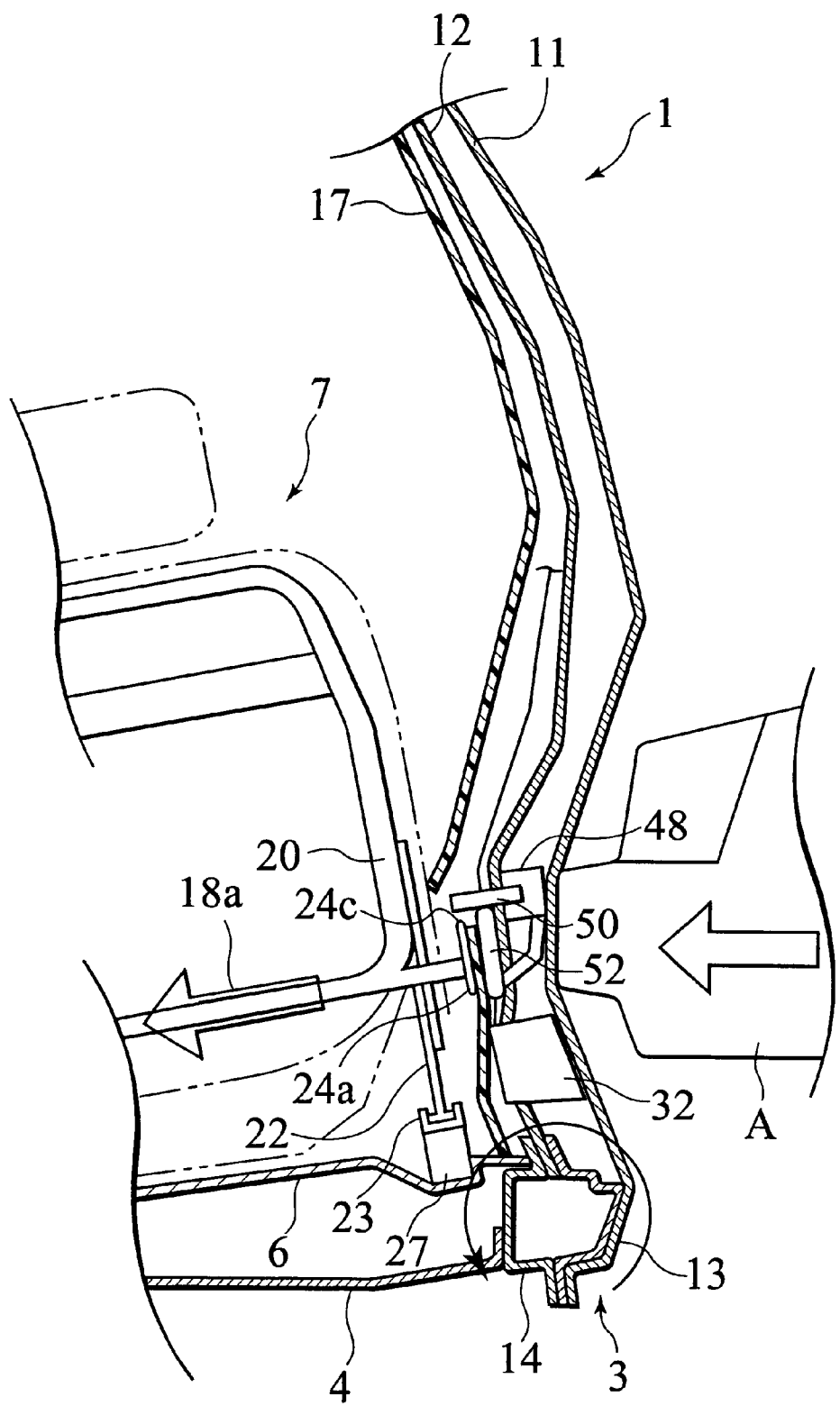
FIG. 23 is a sectional view of the essential part of the side structure of the seventh embodiment, viewed from the front side of the vehicle body at the side collision.

FIGS. 22 and 23 show the seventh embodiment of the present invention. Note that, in this embodiment, elements identical to those in the first embodiment will be indicated with the same reference numerals respectively and their overlapping descriptions are eliminated. According to the embodiment, the inner pillar member 12 is equipped with a cylinder 48 as an actuating unit. In the cylinder 48, a piston rod 50 serving as an engagement member is disposed somewhat higher than the outermost end 24a of the load-direction converting member 24. The piston rod 50 is also adapted so as to project in a direction to approach the outermost end 24a. More preferably, as similar to the first embodiment, the piston rod 50 is positioned higher than the outermost end 24a of the member 24 so that a distance between the cross sectional center of the side sill 3 and the piston rod 50 is equal to or somewhat larger than a distance between the cross sectional center of the side sill 3 and the outermost end 24a of the load-direction converting member 24. The cylinder 48 is connected to a flexible bag 52 as a load detecting unit of the invention. The flexible bag 52 is filled up with non-compressive fluid and communicated with a cylinder chamber in the cylinder 48 through a pipe 51. The flexible bag 52 is disposed between the pillar garnish 17 and the inner pillar member 12 while opposing the outermost end 24a of the load-direction converting member 24 in the vehicle's width direction. As similar to the first embodiment, the pillar garnish 17 has the weakened part 28 formed in the vicinity of the piston rod 50. In detail, the weakened part 28 is formed below the piston rod 50. Simultaneously, in the vehicle's width direction, the part 28 is positioned above or on a substantial level with the outermost end 24*a* of the member 24. The piston rod 50 is also arranged in front or behind the seat belt 37 in order to prevent the interference of the rod 50 with the seat belt 37.

The operation of the seventh embodiment is as follows. When the impact load is applied (inputted) on the lateral side of the vehicle due to the side collision, then the center pillar 1 is deformed as if to rotate similarly to the first embodiment and tries to move to the passenger's room. With the progress of deformation of the center pillar 1, when the outermost end 24*a* of the member 24 comes into contact with the pillar garnish 17, it begins to be broken through the boundary of the weakened part 28 and continuously, the member 24 crushes the pillar garnish 17 furthermore. Then, the flexible bag 52 in the pillar garnish 17 is buckled to feed the contents of the bag 52 into the cylinder 48 via the pipe 51. With the rising of pressure in the flexible bag 52, the pressure in the cylinder chamber of the cylinder 48 is elevated for its activation, so that the piston rod 50 projects to a position higher than the outermost end 24*a* of the member 24. In this way, the outermost end 24*a* of the member 24 engages with the cylinder rod 50 (see FIG. 23).

Accordingly, with the similar effect to the first embodiment, it is possible to restrict the rotation of the seat 7 forcibly and also possible to transmit the load from the vehicle side to the floor tunnel 5 through the load-direction converting member 24. Furthermore, it is possible to reduce the moment generating in the load-direction converting member 24.

Besides the engagement member in one body with the piston rod 50 on the inner pillar member 12, the inner door member 16 may be also provided with the similar engagement member.

In the above-mentioned embodiment, the piston rod 50 (as the engagement unit) is adapted so as to project toward the load-direction converting member 24. In the modification, the flexible bag 52 (as the load detecting unit) and the cylinder 48 (as the actuating unit) may be arranged in the seat 7 on condition that the load-direction converting member 24 has its outermost end 24*a* capable of projecting sideways by means of a piston rod or the like.

[8th. Embodiment]

Figure 24:
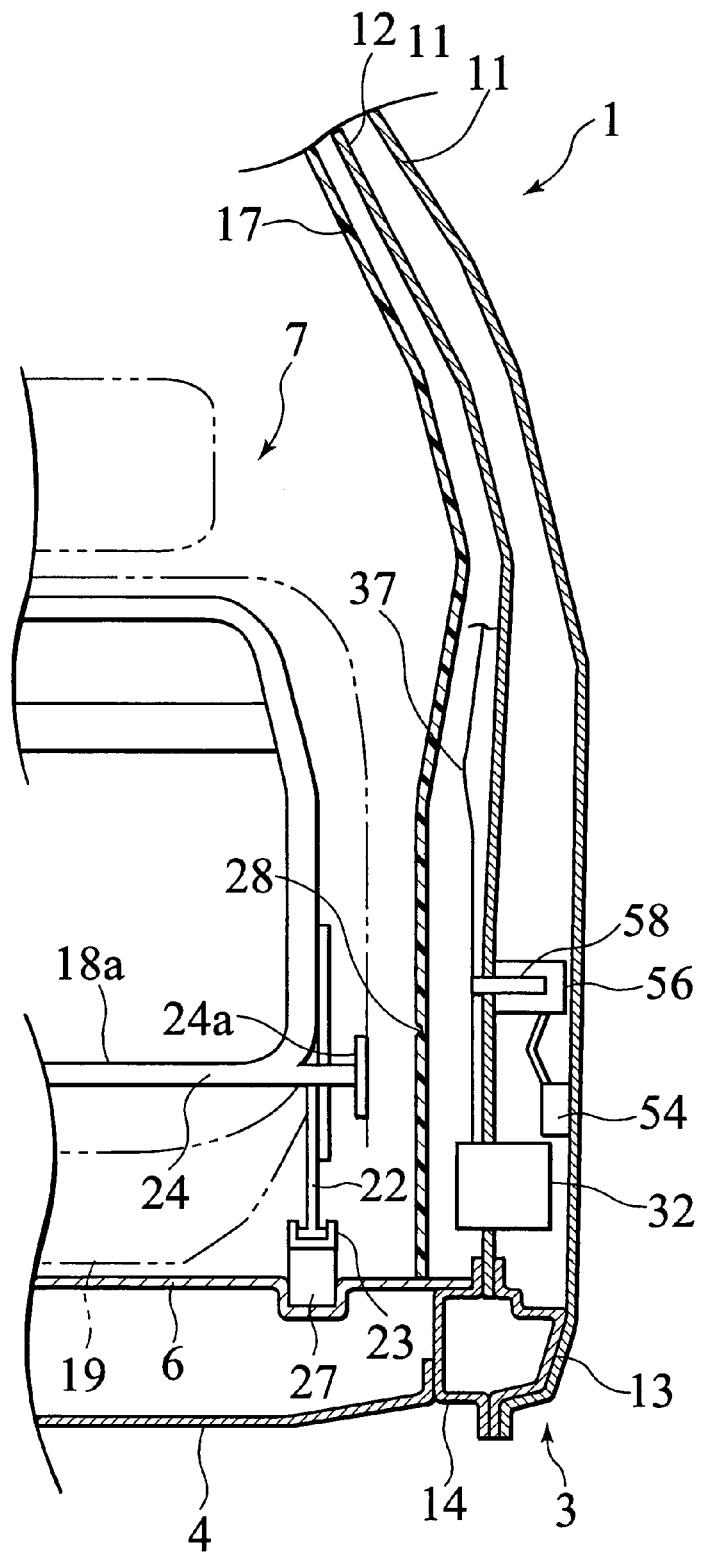
FIG. 24 is a sectional view of the essential part of the side structure of the eighth embodiment, viewed from the front side of the vehicle body.
Figure 25:
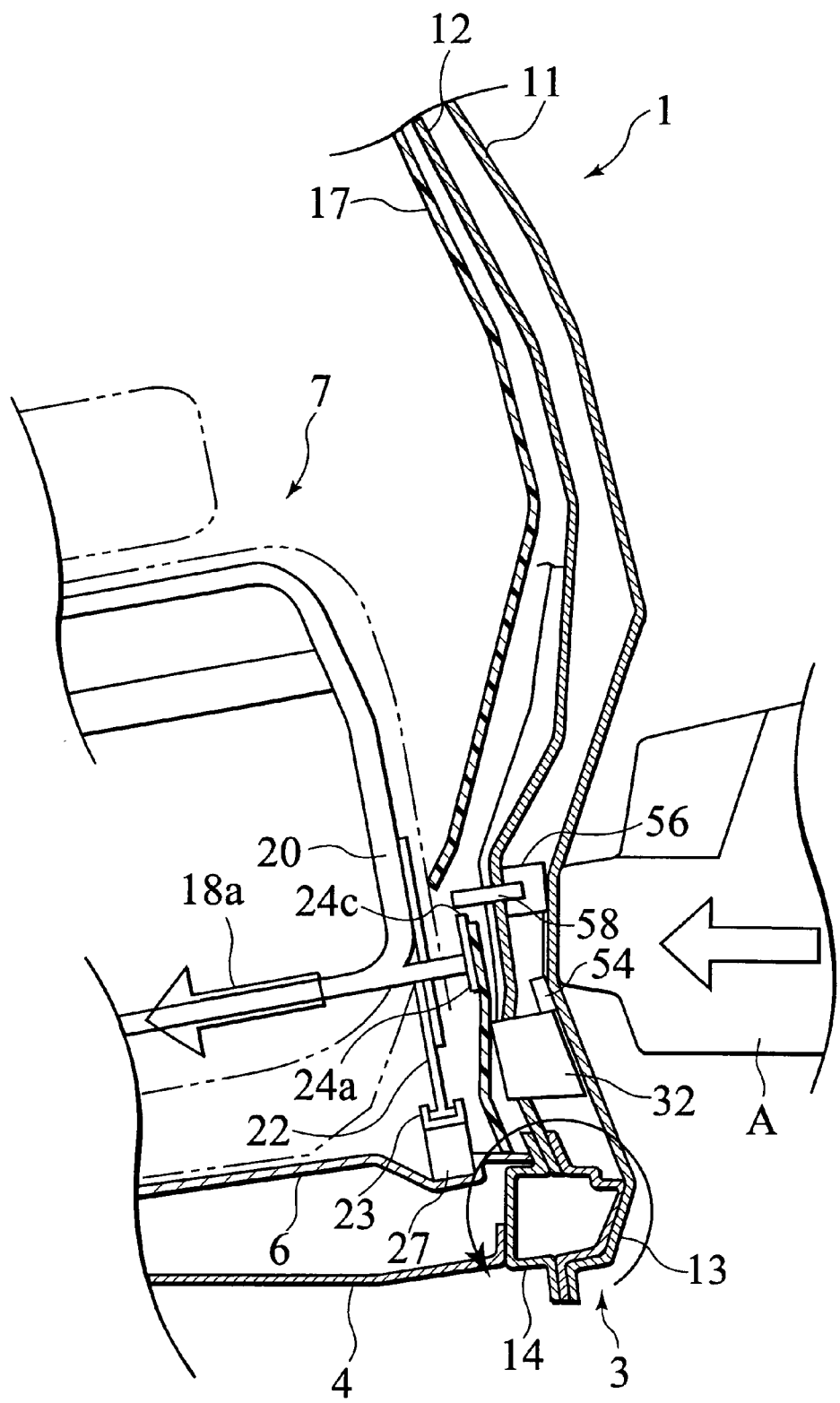
FIG. 25 is a sectional view of the essential part of the side structure of the eighth embodiment, viewed from the front side of the vehicle body at the side collision.

FIGS. 24 and 25 show the eighth embodiment of the present invention. Note that, in this embodiment, elements identical to those in the first embodiment will be indicated with the same reference numerals respectively and their overlapping descriptions are eliminated. According to the embodiment, there are provided a collision sensor (load detecting unit) 54 for detecting the vehicle's side collision, an actuator (actuating unit) 56 arranged in a position similar to the cylinder 48 of the 7th. embodiment and an engagement member 58 connected with the actuator 56, in place of the cylinder 48, the flexible bag 52 and the pipe 51 of the 7th. embodiment. At the vehicle's collision, the collision sensor 54 outputs an electrical signal to the actuator 56. On receipt of the electrical signal, the actuator 56 operates to project the engagement member 58 to a direction to approach the outermost end 24*a* of the load-direction converting member 24. As similar to the first embodiment, the pillar garnish 17 has the weakened part 28 formed in the vicinity of the engagement member 58. For example, the weakened part 28 is formed below the engagement member 58. Simultaneously, in the vehicle's width direction, the part 28 is positioned above or on a substantial level with the outermost end 24*a* of the member 24. The engagement member 58 is also arranged in front or behind the seat belt 37 in order to prevent the interference of the member 58 with the seat belt 37.

The operation of the eighth embodiment is as follows. When the impact load is applied (inputted) on the lateral side of the vehicle due to the side collision, then collision sensor 54 detects the vehicle's collision and generates the electrical signal to the actuator 56. Then, the actuator 56 is operated by the electrical signal, so that the engagement member 58 projects to a position higher than the outermost end 24*a* of the member 24 similarly to the 7th. embodiment. On the other hand, the center pillar 1 is deformed as if to rotate similarly to the first embodiment and tries to move to the passenger's room. With the progress of deformation of the center pillar 1, when the outermost end 24*a* of the member 24 comes into contact with the pillar garnish 17, it begins to be broken through the boundary of the weakened part 28. When the deformation of the vehicle body is further progressed, the engagement member 58 being projected by the actuator 56 in advance is brought into engagement with the outermost end 24*a* of the member 24 (see FIG. 25).

Accordingly, with the similar effect to the first embodiment, it is possible to restrict the rotation of the seat 7 forcibly and also possible to transmit the load from the vehicle side to the floor tunnel 5 through the load-direction converting member 24. Furthermore, it is possible to reduce the moment generating in the load-direction converting member 24.

Besides the engagement member 58 on the inner pillar member 12, the inner door member 16 may be also provided with the similar engagement member.

In the above-mentioned embodiment, the engagement member 58 (as the engagement unit) is adapted so as to project owing to the operation of the actuator 56. In the modification, the load-direction converting member 24 may be provided with the outermost end 24*a* capable of projecting sideways by means of an actuator.

[9th. Embodiment]

Figure 26:
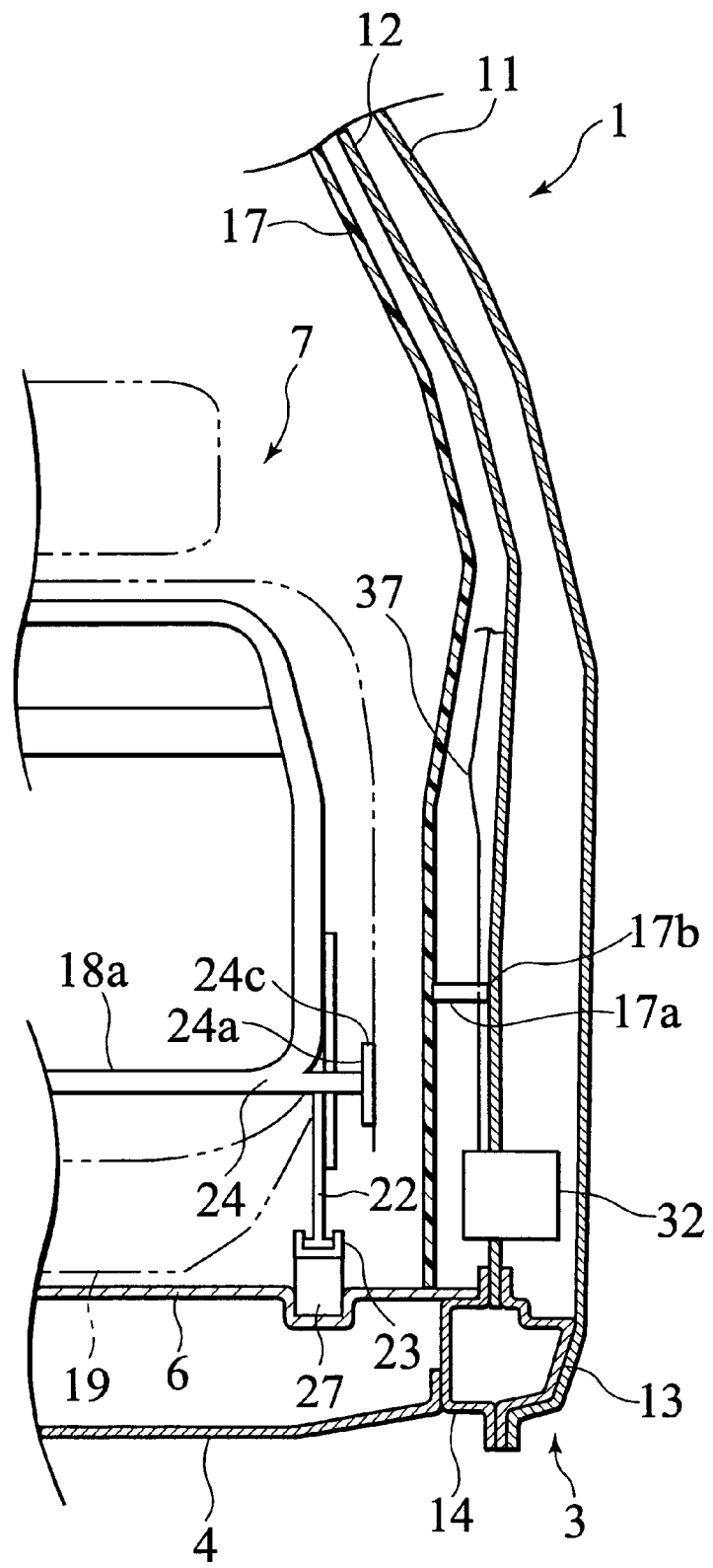
FIG. 26 is a sectional view of the essential part of the side structure of the ninth embodiment, viewed from the front side of the vehicle body.
Figure 27:
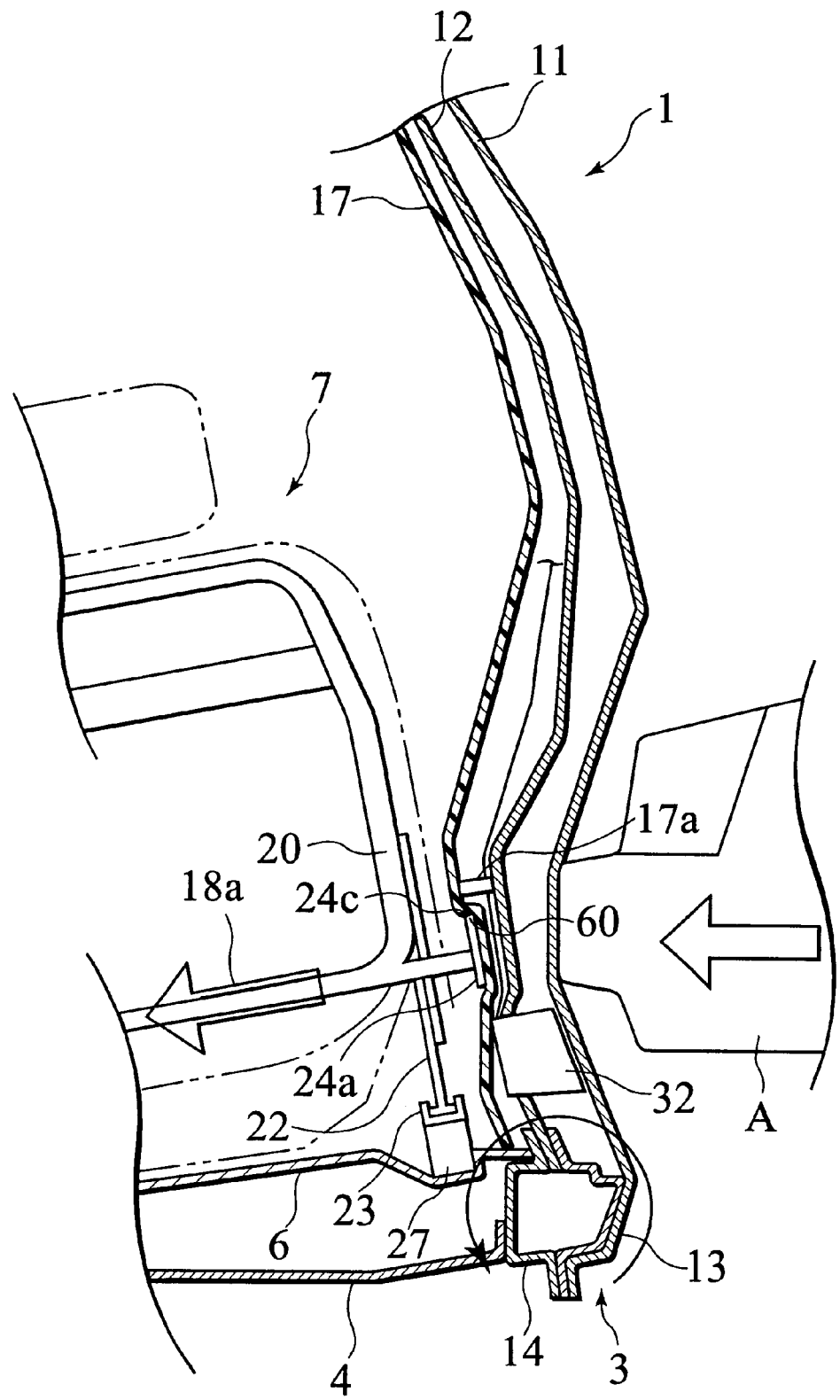
FIG. 27 is a sectional view of the essential part of the side structure of the ninth embodiment, viewed from the front side of the vehicle body at the side collision.

FIGS. 26 and 27 show the ninth embodiment of the present invention. Note that, in this embodiment, elements identical to those in the first embodiment will be indicated with the same reference numerals respectively and their overlapping descriptions are eliminated. In place of the engagement member 25 of the first embodiment, the pillar garnish 17 is provided, inside thereof, with a rib 17*a* having a sufficient strength. Generally opposing the outermost end 24*a* of the load-direction converting member 24 in the vehicle's width direction, the rib 17*a* is positioned higher than the top end 24*c* of the flat plate 24*a*. More preferably, it is established to make a distance between the cross sectional center of the side sill 3 and the rib 17*a* equal to or somewhat larger than a distance between the cross sectional center of the side sill 3 and the top end 24*c* of the load-direction converting member 24. The rib 17*a* is provided, on the side of the inner pillar member 12, with a through-groove 17*b* for allowing the seat belt 37 to pass. The through-groove 17*b* is formed with a width broader than the width of the seat belt 37 so that the groove 17*b* would not interfere with the passage of the seat belt 37.

The operation of the ninth embodiment is as follows. When the impact load is applied (inputted) on the lateral side of the vehicle due to the side collision, then the center pillar 1 is deformed as if to rotate similarly to the first embodiment and tries to move to the passenger's room. With the progress of deformation of the center pillar 1, as soon as the flat plate 24*a* of the member 24 comes into contact with the pillar garnish 17, it begins to be buckled. Although the pillar garnish 17 is locally buckled at its part opposing the flat plate 24a by the member 24, the other part abutting against the rib 17a is not deformed to maintain the part's initial configuration due to the resistance of the rib 17a. Thus, on the pillar garnish 17, a step 60 of the vehicle's width direction is defined between the outermost end 24a of the member 24 and the rib 17a. In this embodiment, the outermost end 24a of the member 24 engages with the so-formed step 60 (see FIG. 27).

Accordingly, with the similar effect to the first embodiment, it is possible to restrict the rotation of the seat 7 forcibly and also possible to transmit the load from the vehicle side to the floor tunnel 5 through the load-direction converting member 24. Furthermore, it is possible to reduce the moment generating in the load-direction converting member 24.

In place of the rib 17a, the pillar garnish 17 may be partially thickened so as to exhibit the function identical to the rib 17b in the modification. Besides the rib 17a on the pillar garnish 17, preferably, such a reinforced part is formed on the door trim 26. Alternatively, such the reinforced part may be formed on the inner pillar member 12 in place of the rib 17b on the pillar garnish 17. Further, such the reinforced part may be formed on the inner door member 16 of the doors 9, 10 instead of the reinforced part on the door trim 26.

[10th. Embodiment]

Figure 28:
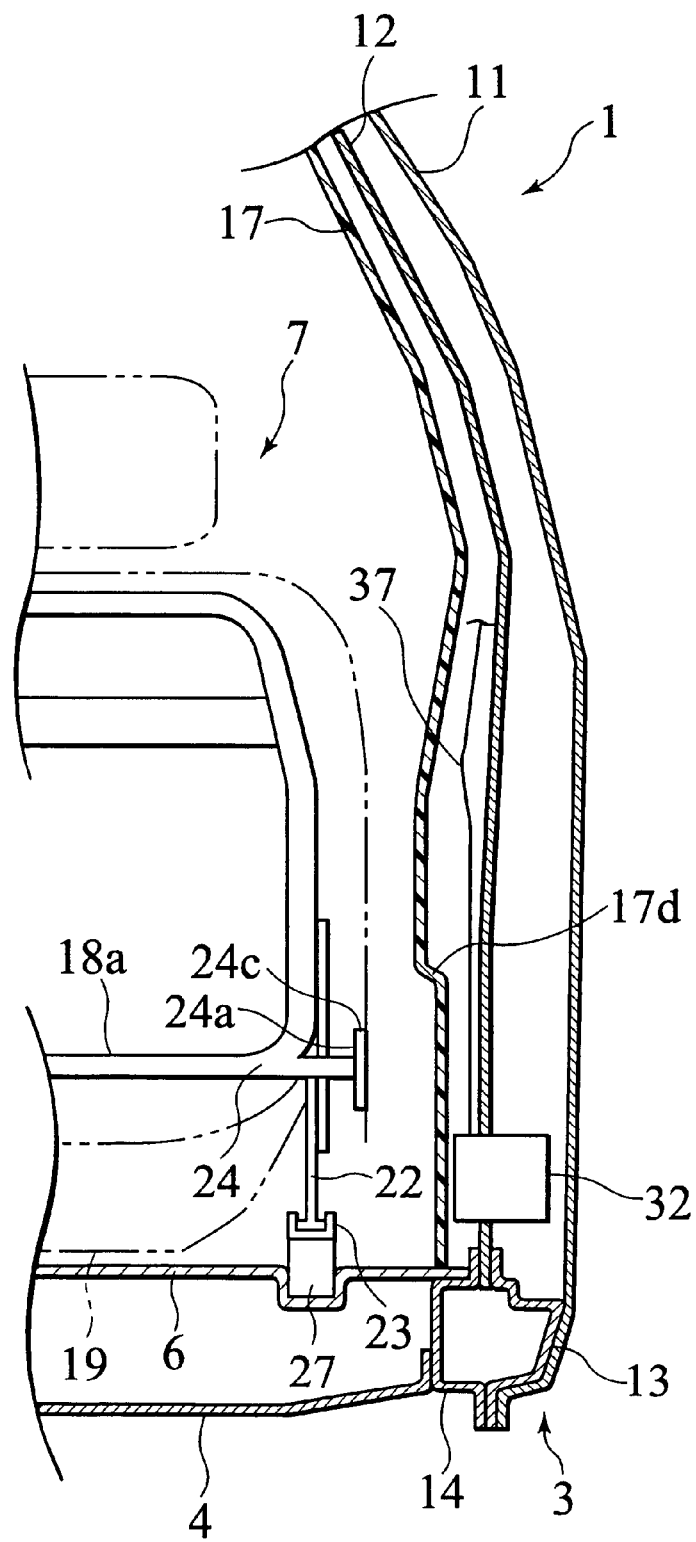
FIG. 28 is a sectional view of the essential part of the side structure of the tenth embodiment, viewed from the front side of the vehicle body.
Figure 29:
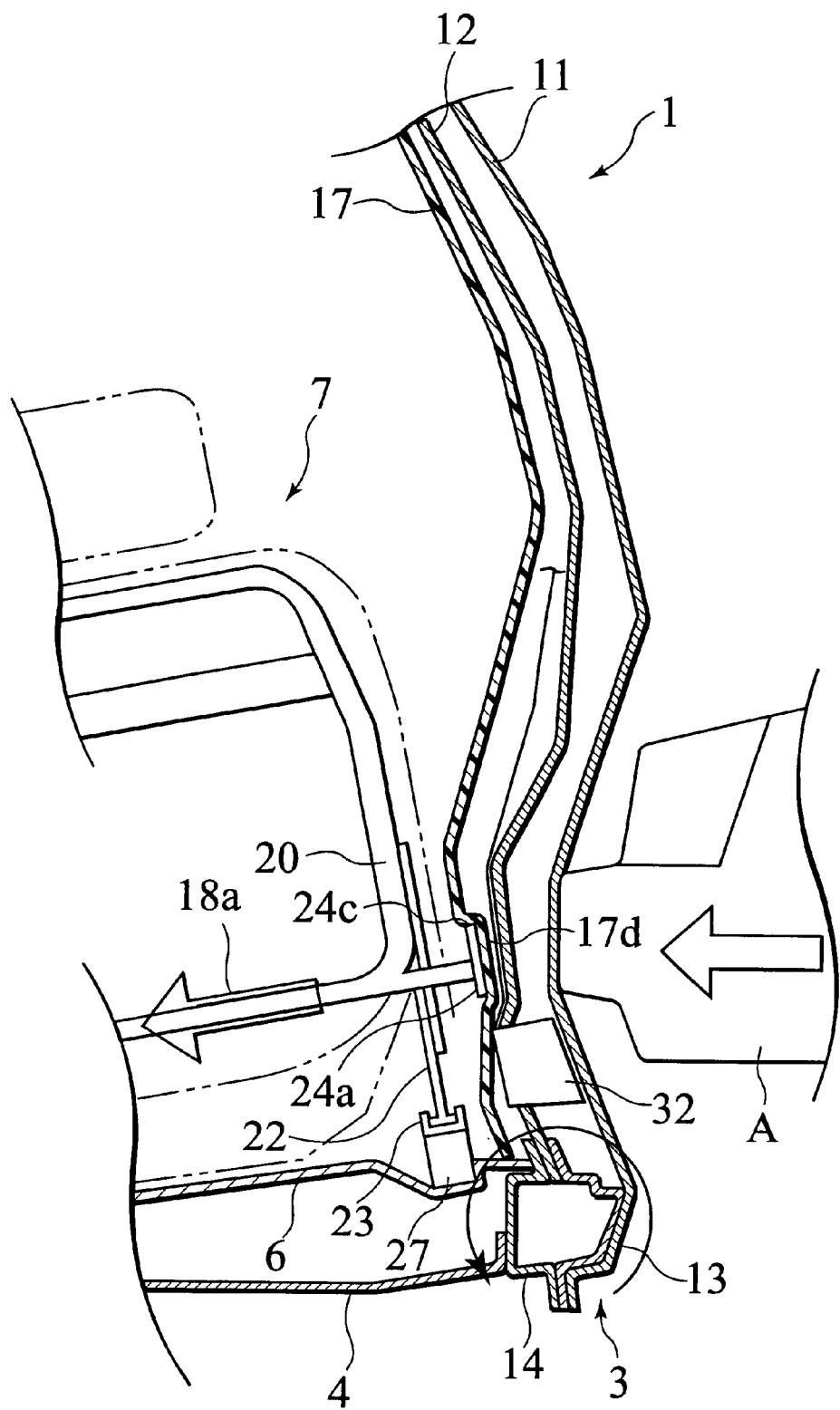
FIG. 29 is a sectional view of the essential part of the side structure of the tenth embodiment, viewed from the front side of the vehicle body at the side collision.

FIGS. 28 and 29 show the tenth embodiment of the present invention. Note that, in this embodiment, elements identical to those in the first embodiment will be indicated with the same reference numerals respectively and their overlapping descriptions are eliminated. In place of the engagement member 25 of the first embodiment, the pillar garnish 17 is provided with a step part 17d having a downward face. Generally opposing the outermost end 24a of the load-direction converting member 24 in the vehicle's width direction, the step part 17d is positioned higher than the top end 24c of the flat plate 24a. More preferably, it is established to make a distance between the cross sectional center of the side sill 3 and the step part 17d equal to or somewhat larger than a distance between the cross sectional center of the side sill 3 and the top end 24c of the load-direction converting member 24. Similarly to the step part 17d, the door trim 26 is also provided with a step part (not shown).

The operation of the tenth embodiment is as follows. When the impact load is applied (inputted) on the lateral side of the vehicle due to the side collision, then the center pillar 1 is deformed as if to rotate similarly to the first embodiment and tries to move to the passenger's room. With the progress of deformation of the center pillar 1, when the flat plate 24a of the member 24 comes into contact with the step part 17d of the pillar garnish 17, the downward face of the step part 17d engages with the outermost end 24a of the member 24 (see FIG. 29).

Accordingly, with the similar effect to the first embodiment, it is possible to restrict the rotation of the seat 7 forcibly and also possible to transmit the load from the vehicle side to the floor tunnel 5 through the load-direction converting member 24. Furthermore, it is possible to reduce the moment generating in the load-direction converting member 24.

In addition to the step part 17d on the pillar garnish 17, the door trim 26 may be provided with such a step part. Alternatively, such the step part may be formed on the inner pillar member 12 in place of the step part 17d on the pillar garnish 17. Further, such the step part may be formed on the inner door member 16 of the doors 9, 10 instead of the step part on the door trim 26.

The entire contents of Japanese Patent Application No. 11-318597 (filed on Nov. 9, 1999) is incorporated herein by reference.

The scope of the invention is defined with reference to the following claims.

What is claimed is:

1. A side structure for a vehicle body, comprising:

a center pillar arranged on a lateral side of a passenger's room to extend up and down, the passenger's room being defined by the vehicle body;

a side panel positioned in front and behind the center pillar, respectively;

a floor panel arranged at the bottom of the passenger's room;

a passenger's seat arranged on the floor panel, the passenger's seat having a seat back and a seat cushion;

a seat back frame disposed inside the seat back;

a reinforcement member disposed inside the seat back so as to extend in a vehicle's width direction; and a rising-preventive mechanism arranged inside one of the center pillar and the side panel to prevent an outermost end of the reinforcement member in the vehicle's width direction from rising when a side impact is applied on the vehicle body.

2. The side structure of claim 1, wherein the rising-preventive mechanism exerts an obliquely-downward and inward load in the vehicle's width direction, on the outermost end of the reinforcement member when the side impact is applied on the vehicle body.

3. The side structure of claim 1, wherein the rising-preventive mechanism has an engagement member which engages with the outermost end of the reinforcement member when the side impact is applied on the vehicle body.

4. A side structure for a vehicle body, comprising:

a center pillar arranged on a lateral side of a passenger's room to extend up and down, the passenger's room being defined by the vehicle body;

a side panel positioned in front and behind the center pillar;

a floor panel arranged at the bottom of the passenger's room;

a passenger's seat arranged on the floor panel, the passenger's seat having a seat back and a seat cushion;

a seat back frame disposed inside the seat back;

a reinforcement member disposed inside the seat back so as to extend in a vehicle's width direction; and a rising-preventive mechanism arranged inside one of the center pillar and the side panel to prevent an outermost end of the reinforcement member in the vehicle's width direction from rising when a side impact is applied on the vehicle body, the rising-preventive mechanism having an engagement member which engages with the outermost end of the reinforcement member when the side impact is applied on the vehicle body.

5. The side structure of claim 4, wherein the outermost end of the reinforcement member is provided with at least one of a projection and a depression; and the engagement member has at least one of a depression and a projection which engages with the projection or depression of the outermost end of the reinforcement member, respectively.

6. The side structure of claim 4, wherein
the outermost end of the reinforcement member is provided with a projection which is engageable with the engagement member.

7. The side structure of claim 4, wherein
the engagement member is arranged along a lateral side of the passenger's room; and
the engagement member is pressed and deformed locally in the vehicle's width direction by the outermost end of the reinforcement member when the side impact is applied on the vehicle body.

8. The side structure of claim 4, wherein
the engagement member is constructed so as to contact with the outermost end of the reinforcement member when the side impact is applied on the vehicle body; and
the outermost end of the reinforcement member comes into contact with the engagement member through respective contact surfaces while producing a high frictional force.

9. The side structure of claim 4, wherein
the engagement member is an element capable of forming a closed sectional structure together with one of the center pillar and the side panel.

10. The side structure of claim 9, wherein
the closed sectional structure is provided, at a lower end thereof, with an opening; and
the outermost end of the reinforcement member has a projecting part capable of entering into the closed sectional structure through the opening.

11. The side structure of claim 4, further comprising:
a load detecting unit for detecting the side impact applied on the vehicle body; and
an actuating unit to be driven on the detection of the side impact by the load detecting unit, wherein
at least one of the engagement member and the outermost end of the reinforcement member of the rising-preventive mechanism is projected to a direction to approach toward the other one of the engagement member and the outermost end of the reinforcement member by the actuating unit.

12. The side structure of claim 11, wherein
the load detecting unit has a flexible bag for accommodating a fluid therein;
the actuating unit has a cylinder communicating with the flexible bag, the cylinder having a piston rod; and
the piston rod of the cylinder is connected with one of the engagement member and the outermost end of the reinforcement member.

13. The side structure of claim 11, wherein
the load detecting unit has a sensor generating an electrical signal when the side impact is applied on the vehicle body;
the actuating unit has an actuator to be operated by the electrical signal from the sensor.

14. The side structure of claim 4, wherein
the engagement member is attached to one of an inside face of the center pillar and an inside face of the side panel.

15. The side structure of claim 4, wherein
the engagement member has an reinforced part formed integrally with one of the center pillar, a garnish attached inside the center pillar, the side panel and a trim member attached to the side panel.

16. The side structure of claim 4, wherein
the engagement member has a step part formed integrally with one of the center pillar, a garnish attached inside the center pillar, the side panel and a trim member attached to the side panel.

17. The side structure of claim 4, wherein
the rising-preventive mechanism has a weakened part which is arranged in the vicinity of the engagement member and also formed in one of a garnish attached to the center pillar or a trim member attached to the side panel.

18. The side structure of claim 17, wherein
the weakened part is formed so as to extend in a fore-and-aft direction of the vehicle.

19. The side structure of claim 4, wherein
the engagement member is provided with a through-groove for passing a seat belt therethrough,
a weakened part is formed in the rising prevention mechanism so as to extend in either a fore-and-aft direction of the vehicle.

20. The side structure of claim 4, wherein
the engagement member is arranged corresponding to a moving range of the outermost end of the reinforcement member moving as the passenger's seat is slid to a fore-and-aft direction of the vehicle.

21. The side structure of claim 4, wherein
the engagement member has a lower engageable end established higher than an upper engageable end of the outermost end of the reinforcement member.

22. The side structure of claim 1, wherein
the reinforcement member has a load-direction converting member which transmits the side impact, which has been exerted to the vehicle body at a location higher than a floor tunnel both projecting at the floor panel's center of the vehicle's width direction upward and extending in a fore-and-aft direction of the vehicle, to the floor tunnel.

23. The side structure of claim 22, wherein
the load-direction converting member is formed integrally with a lower frame part forming the seat back frame.

24. A side structure for a vehicle body, comprising:
a center pillar arranged on a lateral side of a passenger's room to extend up and down, the passenger's room being defined by the vehicle body;
a side panel positioned in front and behind the center pillar, respectively;
a floor panel arranged at the bottom of the passenger's room;
a passenger's seat arranged on the floor panel, the passenger's seat having a seat back and a seat cushion;
a seat back frame disposed inside the seat back;
a reinforcement member disposed inside the seat back so as to extend in a vehicle's width direction; and
rising-preventive means for preventing an outermost end of the reinforcement member in the vehicle's width direction from rising due to a side impact applied on the vehicle body, the rising-preventive means being arranged beside the passenger's seat.

* * * * *